US007558583B2

(12) United States Patent
Ledeczi et al.

(10) Patent No.: US 7,558,583 B2
(45) Date of Patent: Jul. 7, 2009

(54) SYSTEM AND METHODS OF RADIO INTERFERENCE BASED LOCALIZATION IN SENSOR NETWORKS

(75) Inventors: Akos Ledeczi, Nashville, TN (US); Miklos Maroti, Szeged (HU); Peter Volgyesi, Balatonszarszo (HU); Andras Nadas, Kecskemet (HU); Karoly Molnar, Budapest (HU); Sebestyen Dora, Szekesfehervar (HU); Branislav Kusy, Banovce nad Bebravou (SK); Gyorgy Balogh, Váchartyán (HU)

(73) Assignee: Vanderbilt University, Nashville, TN (US)

(*) Notice: Subject to any disclaimer, the term of this patent is extended or adjusted under 35 U.S.C. 154(b) by 652 days.

(21) Appl. No.: 11/401,115

(22) Filed: Apr. 10, 2006

(65) Prior Publication Data

US 2007/0042706 A1 Feb. 22, 2007

Related U.S. Application Data

(60) Provisional application No. 60/669,652, filed on Apr. 8, 2005.

(51) Int. Cl.
*H04W 24/00* (2009.01)
(52) U.S. Cl. .................... 455/456.1; 455/1; 455/73; 455/39; 455/418; 455/404.2; 455/414.2; 455/9; 455/115.1; 455/115.2
(58) Field of Classification Search ............. 455/456.1, 455/73, 1, 39, 419, 418, 404.2, 414.2, 115.1, 455/115.2
See application file for complete search history.

(56) References Cited

U.S. PATENT DOCUMENTS

| | | | | |
|---|---|---|---|---|
| 6,208,247 | B1 * | 3/2001 | Agre et al. | 340/539.19 |
| 6,735,630 | B1 * | 5/2004 | Gelvin et al. | 709/224 |
| 6,826,607 | B1 * | 11/2004 | Gelvin et al. | 709/224 |
| 6,847,587 | B2 * | 1/2005 | Patterson et al. | 367/127 |
| 7,016,812 | B2 * | 3/2006 | Aritsuka et al. | 702/188 |
| 7,231,237 | B2 * | 6/2007 | Kinezos et al. | 455/575.7 |
| 7,305,467 | B2 * | 12/2007 | Kaiser et al. | 709/224 |
| 7,372,772 | B2 * | 5/2008 | Brinn et al. | 367/127 |
| 7,408,840 | B2 * | 8/2008 | Barger et al. | 367/127 |
| 7,433,266 | B2 * | 10/2008 | Ledeczi et al. | 367/129 |
| 7,457,834 | B2 * | 11/2008 | Jung et al. | 707/204 |
| 2005/0175038 | A1 * | 8/2005 | Carlson et al. | 370/503 |
| 2008/0261509 | A1 * | 10/2008 | Sen | 455/1 |

OTHER PUBLICATIONS

Gy. Simon, M. Maroti A. Ledeczi et al., *Sensor network-based countersniper system*, ACM 2nd Conference on Embedded Networked Sensor Systems (SenSys), Nov. 2004, 1-12.
T. He, S. Krishnamurthy, J. Stankovic, et al., *An Energy-Efficient Surveillance System Using Wireless Sensor Networks*, MobiSys'04, Jun. 2004.

(Continued)

*Primary Examiner*—Charles N Appiah
*Assistant Examiner*—Kwasi Karikari
(74) *Attorney, Agent, or Firm*—Morris, Manning & Martin LLP; Tim Tingkang Xia

(57) ABSTRACT

A method for radio interference based sensor localization. In one embodiment, the method has the steps of creating an interference signal from a first transmitter and a second transmitter, measuring phase offsets of the interference signal received by a first receiver and a second receiver, respectively, and determining the locations of the first and second transmitters and the first and second receivers from the measured phase offsets.

26 Claims, 12 Drawing Sheets

OTHER PUBLICATIONS

H. Wang, J. Elson, L. Girod, D. Estrin, K. Yao, *Target classification and localization in a habitat monitoring application*, In Proc. of the IEEE ICASSP, Apr. 2003.

Y. Kwon, K. Mechitov, S. Sundresh, W. Kim and G. Agha, *Resilient localization for sensor networks in outdoor environments*, Technical Report UIUCDCS-R-2004-2449, Department of Computer Science, University of Illinois at Urbana Champaign, 2004.

K. Whitehouse and D. Culler, *Calibration as parameter estimation in sensor networks*, In Proc of the 1st ACM international workshop on wireless sensor networks and applications, Atlanta, GA, 2002.

J. Sallai, Gy. Balogh, M. Maroti, A. Ledeczi and B. Kusy, *Acoustic ranging in resource-constrained sensor networks*, International Conference on Wireless and Mobile Computing (ICWN), Jun. 2004.

N.B. Priyantha, A. Chakraborty and H. Balakrishnan, *The Cricket Location-Support System*, In Proc. of MobiCom 2000: The Sixth Annual International Conference on Mobile Computing and Networking, Boston, MA, Aug. 2000.

K. Whitehouse, C. Karlof, A. Woo, F. Jiang and D. Culler, *The Effects of Ranging Noise on Multihop Localization: An Empirical Study*, in Proc. of IPSN, Los Angeles, CA, Apr. 2005.

J. Hightower, R. Want and G. Borriello, *SpotON: An Indoor 3D Location Sensing Technology Based on RF Signal Strength*, University of Washingtion, Tech. Rep. UW CSE 2000-02-02, Feb. 2000.

K. Yedavalli, B. Krishnamachari, S. Ravula and Srinivasan, *Ecolocation: A Technique for RF Based Localization in Wireless Sensor Networks*, Proc. of IPSN, Los Angeles, CA, Apr. 2005.

D. Niculescu and B. Nath, *Ad Hoc Positioning System (APS)*, in Proc. of IEEE Globecom 2001, San Antonio, Nov. 2001.

L. Meertens, *The Dimension of the Vector Space Spanned by Sets of Radio Interferometric Measurements*, Technical Report KES.U.05.02, Kestrel Institute, Jul. 2005.

D. Rife and R. Boorstyn, *Single tone parameter estimation from discrete-time observations*, IEEE Transactions on Information Theory, vol. 20, Issue 5, pp. 591-598, Sep. 1974.

S.A. Tretter, *Estimating the Frequency of a Noisy Sinusoid by Linear Regression*, IEEE Transactions on Information Theory, vol. 31, Issue 6, pp. 832-835, Nov. 1985.

M. Maroti, B. Kusy, Gy. Simon and A. Ledeczi, *The flooding time synchronization protocol*, ACM 2nd Conference on Embedded Networked Sensor Systems (SenSys), Nov. 2004, 39-49.

J. Hill, R. Szewczyk, A. Woo, S. Hollar, D. Culler, and K. Pister, *System architecture directions for networked sensors*, ASPLOS 2000, Cambridge, MA, Nov. 2000.

J. Polastre, R. Szewczyk, C. Sharp and D. Culler, *The Mote Revolution: Low Power Wireless Sensor Network Devices*, in Proc. of Hot Chips 16, Aug. 2004.

Chipcon Inc., *Chipcon CC1000 Data Sheet*, ver. 2.2.

\* cited by examiner

SYSTEM AND METHODS OF RADIO INTERFERENCE BASED LOCALIZATION IN SENSOR NETWORKS

CROSS-REFERENCE TO RELATED PATENT APPLICATION

This application claims the benefit, pursuant to 35 U.S.C. § 119(e), of U.S. provisional patent application Ser. No. 60/669,652, filed Apr. 8, 2005, entitled "SYSTEM AND METHOD OF RADIO INTERFERENCE BASED LOCALIZATION IN SENSOR NETWORKS," by Miklos Maroti, and Akos Ledeczi, which is incorporated herein by reference in its entirety.

Some references, which may include patents, patent applications and various publications, are cited and discussed in the description of this invention. The citation and/or discussion of such references is provided merely to clarify the description of the present invention and is not an admission that any such reference is "prior art" to the invention described herein. All references cited and discussed in this specification are incorporated herein by reference in their entireties and to the same extent as if each reference was individually incorporated by reference. In terms of notation, hereinafter, "[n]" represents the nth reference cited in the reference list. For example, [15] represents the 15th reference cited in the reference list, namely, M. Maroti, B. Kusy, Gy. Simon and A. Ledeczi, *The flooding time synchronization protocol*, ACM 2nd Conference on Embedded Networked Sensor Systems (SenSys), November 2004, 39-49.

STATEMENT OF FEDERALLY-SPONSORED RESEARCH

The present invention was made with Government support under a contract F33615-01-C-1903 awarded by Defense Advanced Research Projects Agency (DARPA) through the DARPA/IXO NEST Program. The United States Government has certain rights to this invention pursuant to this grant.

FIELD OF THE INVENTION

The present invention generally relates to a method of localization, and more particularly to a system and methods of using radio interference for localization of sensor nodes in a wireless sensor network.

BACKGROUND OF THE INVENTION

Many applications of a wireless sensor network (hereinafter "WSN") require the knowledge of where the individual nodes are located [1-3]. Yet robust sensor localization is still an open problem today. While there are many approaches in existence, they all have significant weaknesses that limit their applicability to real world problems. Techniques based on accurate ranging such as acoustic ranging have limited range [4-6]. They need an actuator/detector pair that adds to the cost and size of a platform. Furthermore, many applications require stealthy operation making ultrasound the only acoustic option. However, ultrasonic methods have even more limited range and directionality constraints [7, 8]. Methods utilizing the radio usually rely on a received signal strength that is relatively accurate in short ranges with extensive calibration, but imprecise beyond a few meters [8-10]. The simplest of methods deduce rough location information from radio hop count [11]. In effect, they also use radio signal strength, but they quantize it to a single bit. Finally, most of the proposed methods work in 2-demission (hereinafter "2D") only. A recent survey of localization methods and their performance has been reported [8].

Existing WSN localization methods have either high accuracy or acceptable range, but not both at the same time. Furthermore, the very physical phenomenon they use—acoustics and radio signal strength—do not show any promise of achieving the significant improvement that is necessary to move beyond the current state of the art.

Therefore, a heretofore unaddressed need exists in the art to address the aforementioned deficiencies and inadequacies.

SUMMARY OF THE INVENTION

In one aspect, the present invention relates to a method for radio interference based sensor localization in a wireless sensor network, where the wireless sensor network has a plurality of spatially separated sensor nodes with each capable of transmitting and/or receiving a signal. In one embodiment, the method includes the steps of (a) selecting a first sensor node and a second sensor node as a pair of transmitters and each of the remaining sensor nodes as a receiver in the wireless sensor network, respectively, (b) transmitting a first signal and a second signal from the selected first sensor node and the selected second sensor node, respectively, to the wireless sensor network, where the first signal has a frequency, $f_1$, and the second signal has a frequency, $f_2$, the frequencies $f_1$ and $f_2$ being substantially close to each other such that a superposition of the first signal and the second signal in a position of space where a receiver is located results in an interference signal, (c) using the interference signal received by each of the receivers to estimate a phase offset of the received interference signal at the corresponding receiver, respectively, (d) obtaining a difference of the phase offsets of the interference signal for a pair of receivers, (e) calculating a distance range between the pair of transmitters and the corresponding pair of receivers from the obtained difference of phase offsets of the interference signal for the pair of receivers, (f) repeating steps (d) and (e) for the remaining receivers to obtain a set of the distance ranges, and (g) localizing relative positions of the plurality of spatially separated sensor nodes in the wireless sensor network from the set of the distance ranges, where the distance range is a function of distances between the pair of transmitters and the corresponding pair of receivers.

The method further includes the step of calibrating the pair of transmitters to simultaneously transmit the first signal and the second signal, respectively. The method also includes the step of synchronizing start times of signal transmissions and/or receptions at different sensor nodes of the wireless sensor network before a sensor node transmits and/or receives a signal at a predetermined frequency. Moreover, the method may include the step of performing a frequency tuning algorithm to determine a radio frequency setting for the pair of transmitters to transmit the first and second signals with a frequency difference substantially close to zero. The frequency tuning algorithm comprises the steps of transmitting a first signal at a frequency varied at a fine-grain step and a second signal at a fixed frequency from a first and second transmitters of the pair of transmitters, respectively, analyzing a frequency of the interference signal received by a receiver to determine the frequency of the first signal for which the frequency of the interference signal substantially close to zero, wherein the frequency of the interference signal is coincident with the frequency difference of the first signal and the second signal, and propagating information of the analyzed frequency back to the first transmitter by the receiver, thereby causing the first transmitter to determine the radio frequency setting of the pair of transmitters for which the frequency of the interference signal is within a predetermined range.

In one embodiment, the frequency $f_1$ of the first signal and the frequency $f_2$ of the second signal are in the range of radio frequency from about 3 Hz to about 3,000 GHz. The localizing step is performed with a genetic algorithm. The selecting step is performed with a base station.

In another aspect, the present invention relates to a method for radio interference based sensor localization in a wireless sensor network, where the wireless sensor network has a plurality of spatially separated sensor nodes with each capable of transmitting and/or receiving a signal. In one embodiment, the method comprises the following steps: a) a pair of sensor nodes are selected from a group of sensor nodes as a pair of transmitters and each of the remaining sensor nodes in the group of sensor nodes is selected as a receiver, respectively, where the group of sensor nodes is selected from the wireless sensor network such that the sensor nodes in the group are located within a spatial range; b) transmission times for the pair of transmitters to transmit a pair of signals are scheduled, where the pair of signals create an interference signal in a position of space where a receiver is located, and wherein the interference signal has an interference range coincident with the spatial range; c) the pair of transmitters are calibrated to simultaneously transmit the pair of signals at frequencies within a radio frequency setting at the scheduled transmission times, wherein the frequencies of the pair of signals vary according to a fine-grain step at different transmission times; d) the pair of signals at the frequencies are transmitted from the pair of transmitters at the scheduled transmission times; e) received signal strength indicator (RSSI) samples of the interference signal at each of the receivers are analyzed so as to estimate the frequency and phase offset of the interference signal, respectively; f) a difference of the phase offsets of the interference signal for a pair of receivers is obtained; g) a distance range between the pair of transmitters and the pair of receivers is calculated from the obtained difference of phase offsets of the interference signal for each pair of receivers to obtain a set of the distance ranges; and h) relative positions of the group of sensor nodes in the wireless sensor network are localized from the set of the distance ranges where the distance range is a function of distances between the pair of transmitters and the corresponding pair of receivers. In one embodiment, each of the pair of signals comprises a sine wave.

Furthermore, the method comprises the step of repeating steps a)-h) for the rest of the plurality of spatially separated sensor nodes in the wireless sensor network. Moreover, the method has the step of synchronizing the group of sensor nodes to a common time base so as to align start times of signal transmissions from the pair of transmitters and signal receptions by the receivers of the group of sensor nodes. In one embodiment, the synchronizing step comprises the steps of initializing one of the pair of transmitters to broadcast a radio message to the rest of the group of sensor nodes, wherein the radio message contains information of the other transmitter, signal transmission powers, a type of measurement, and a time instant in the local time of the broadcasting transmitter when the measurement is started and is accompanied with a timestamp, converting the arrival timestamp of the radio message at each receiver to the local time of the receiver, respectively, setting up a local timer by the converted local time, and re-broadcasting the converted local time.

In one embodiment, the calibrating step is performed with a frequency tuning algorithm. The frequency tuning algorithm has the steps of transmitting a first signal at a frequency varied at a fine-grain step and a second signal at a fixed frequency from a first and second transmitters of the pair of transmitters, respectively, analyzing a frequency of the interference signal received by a receiver to determine the frequency of the first signal for which the frequency of the interference signal substantially close to zero, wherein the frequency of the interference signal is coincident with the frequency difference of the first signal and the second signal, and propagating information of the analyzed frequency back to the first transmitter by the receiver, thereby causing the first transmitter to determine the radio frequency setting of the pair of transmitters for which the frequency of the interference signal is within a predetermined range.

In one embodiment, the localizing step is performed with a genetic algorithm, where the genetic algorithm includes the steps of (i) generating a population of population-size random solutions, (ii) selecting a subset of population-size solutions randomly from the solutions, (iii) evaluating each solution in the subset using an error function, wherein the error function is defined over the node localizations, (iv) sorting the solutions of the subset according to errors, (v) removing the worst 20% of the solutions of the subset, (vi) generating new solutions by selecting random parents from the best 20% of the rest of the subset and applying genetic operators on the parents, and (vii) repeating steps (ii)-(vi) until solutions for the relative localizations of the nodes are found.

The selecting, scheduling, calculating and localizing steps are performed with a base station.

In yet another aspect, the present invention relates to a method for radio interference based sensor localization. In one embodiment, the method comprises the steps of creating an interference signal from a first transmitter and a second transmitter, measuring phase offsets of the interference signal received by a first receiver and a second receiver, respectively, and determining the locations of the first and second transmitters and the first and second receivers from the measured phase offsets. The first and second transmitters and the first and second receivers are spatially separated and communicate to each other wirelessly. In one embodiment, the first and second transmitters are configured to transmit a pair of radio frequency signals having a frequency difference substantially close to zero.

In a further aspect, the present invention relates to software stored on a computer readable medium for causing a computing system to perform radio interference based sensor localization in a wireless sensor network according to the method disclosed above.

In yet a further aspect, the present invention relates to a system for radio interference based sensor localization. In one embodiment, the system has a sensor network having a number, N, of spatially separated sensor nodes, N being an integer, wherein the number N of spatially separated sensor nodes have a first transmitter node and a second transmitter node for transmitting a first signal and a second signal, respectively, to the sensor network, and (N-2) receiver nodes. The first signal has a frequency, $f_1$, and the second signal has a frequency, $f_2$, the frequencies $f_1$ and $f_2$ being substantially close to each other such that a superposition of the first signal and the second signal in a position of space where a receiver node is located results in an interference signal. In one embodiment, the number N of spatially separated sensor nodes are located in a 2-dimension configuration. The number N of spatially separated sensor nodes, in another embodiment, are located in a 3-dimension configuration. The number N of spatially separated sensor nodes communicate to each other wirelessly. In one embodiment, each of the number N of spatially separated sensor nodes comprises a radio chip. The radio chip is capable of transmitting a radio frequency signal in a predetermined frequency band at different power levels, transmitting the radio frequency signal with a short-term stability of the frequency, tuning the frequency of the radio frequency signal in fine-grain steps, and precisely capturing the interference signal. In one embodiment, each of the first and second signals comprises a radio frequency wave.

Furthermore, the system has a base station for communicating with the number N of spatially separated sensor nodes in the sensor network and processing information received from the number N of spatially separated sensor nodes so as to localize the number N of spatially separated sensor nodes. In one embodiment, the base station comprises a computer.

In one aspect, the present invention relates to a sensor network. In one embodiment, the sensor network comprises a first transmitter node and a second transmitter node, and a plurality of nodes, where the first transmitter node, the second transmitter node and the plurality of nodes are communicatable wirelessly, and when the first transmitter node and the second transmitter node transmit signals simultaneously at slightly different frequencies to form a composite signal, at least two of the plurality of nodes receive the composite signal and generate a relative phase offset, from which the relative locations of the nodes are determinable. In one embodiment, the nodes are spatially separated.

These and other aspects of the present invention will become apparent from the following description of the preferred embodiment taken in conjunction with the following drawings, although variations and modifications therein may be affected without departing from the spirit and scope of the novel concepts of the disclosure.

DETAILED DESCRIPTION OF THE INVENTION

Figure 1:
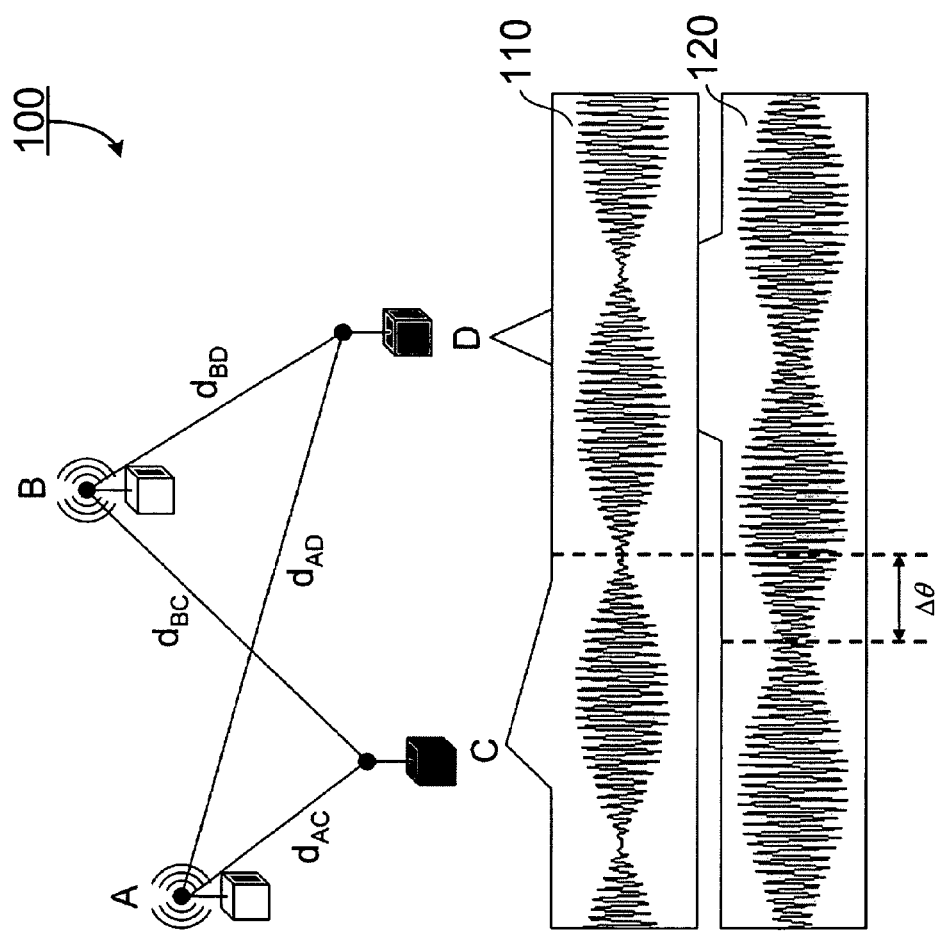
FIG. 1 shows schematically a wireless sensor network according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which has no influence on the scope of the invention. Additionally, some terms used in this specification are more specifically defined below.

DEFINITIONS

The terms used in this specification generally have their ordinary meanings in the art, within the context of the invention, and in the specific context where each term is used.

Certain terms that are used to describe the invention are discussed below, or elsewhere in the specification, to provide additional guidance to the practitioner in describing the apparatus and methods of the invention and how to make and use them. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to various embodiments given in this specification. Furthermore, subtitles may be used to help a reader of the specification to read through the specification, which the usage of subtitles, however, has no influence on the scope of the invention.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "radio frequency" refers to in the range of a radio wave from about 3 Hz to about 3,000 GHz.

As used herein, the term "sensor network" refers to a network of several, spatially distributed sensors that can be used to monitor conditions at different locations, such as temperature, sound, vibration, pressure, motion or pollutants. Usually these sensors are small and inexpensive, so that they can be produced and deployed in large numbers, and so their resources in terms of energy, memory, computational speed and bandwidth are severely constrained. Each sensor can be equipped with a radio transceiver, a small microcontroller, and an energy source, usually a battery. The sensors communicate to each other and transport data to a base station such as a computer. If the communication is wireless, the sensor network is usually called as "wireless sensor network" (WSN). In exemplary embodiments of the present invention, a sensor network comprises a MICA2 mote including a low power microcontroller, a 433 MHz Chipcon CC1000 multi-channel radio transceiver, and a flash memory. The MICA2 mote is powered with one or more batteries.

The term "localization", as used herein, refers to the determination of the locality or position of an object, such as a sensor node in a sensor network.

As used herein, the term "synchronization" refers to coordination with respect to time of two or more events.

As used herein, the term "interference" refers to a superposition of two waves resulting in a new wave pattern. As most commonly used, the term usually refers to the interference of waves which are correlated or coherent with each other, either because they come from the same source or because they have the same or nearly the same frequency. With respect to the present invention, the two waves forming an interference signal have the same or nearly the same frequency and are transmitted from a pair of spatially separated sensor nodes in a WSN.

OVERVIEW OF THE INVENTION

Traditional radio interferometry has many applications in physics, geodesy and astronomy. The method is based on two directional antennas measuring the radio signal from a single source and performing a cross correlation. The resultant interference signal can be further analyzed to create radio images of distant celestial objects, determine the relative location of two receivers very precisely, or conversely, determine the location of a radio source when the location of the two receivers are known. A radio interferometer is an expensive device requiring tunable directional antennas, very high sampling rates and high precision time synchronization. Thus, it is not directly applicable to WSNs.

The present invention generally relates to a method of localization, and more particularly to a system and methods of using radio interference for localization of sensor nodes in a WSN. In one embodiment, a pair of sensor nodes emit a pair of radio waves (signals) simultaneously at slightly different frequencies. The carrier frequency of the composite signal is between the two frequencies, but has a very low frequency envelope. Neighboring sensor nodes can measure the energy of the envelope signal as the signal strength. The relative phase offset of this signal measured at two receivers is a function of the distances between the four nodes involved and the carrier frequency. By making multiple measurements in the WSN, the relative location of the sensor nodes in 3-dimension (hereinafter "3D") is reconstructed. One key feature of the method is that the phase offset of a low frequency signal is measured, yet it corresponds to the wavelength of the high frequency carrier signal. Accordingly, the method enables one to localize positions of sensor nodes of a WSN in both high accuracy and long range simultaneously.

Radio interferometric positioning exploits interfering radio waves emitted from two locations at slightly different frequencies to obtain the necessary ranging information for localization. The composite radio signal has a low beat frequency and its envelope signal can be measured with low precision radio frequency chips using the received signal strength indicator (hereinafter "RSSI") signal. The phase offset of this signal depends on many factors, including the time instances when the transmissions were started. However, the relative phase offset between two receivers depends only on the four distances between the two transmitters and two receivers and on the wavelength of the carrier frequency. By measuring this relative phase offset at different carrier frequencies, a linear combination of the distances between the nodes can be calculated, and thereby ultimately inferring their relative position.

Without intent to limit the scope of the invention, the theoretical outlines for interferometric positioning are described below. Sensor nodes in a WSN are denoted by capital roman letters, and the distance between nodes X and Y is denoted by $d_{XY}$, and the speed of light is c in the specification. An exemplary embodiment of the WSN 100 is shown in FIG. 1, where sensor nodes A and B are two transmitters while sensor nodes C and D are two receivers. Distances between the transmitters A and B and the receivers C and D are indicated by $d_{AC}$, $d_{AD}$, $d_{BC}$ and $d_{BD}$, respectively. Interference signals received by the receivers C and D are respectively shown by signals 110 and 120. $\theta_C$ and $\theta_D$ indicate an absolutely phase offset of the signals 110 and 120, respectively, while $\Delta\theta = \theta_{C-\theta D}$ represents the relative phase offset of the signals 110 and 120.

Additionally, the radio RSSI circuitry is modeled in the following way. The RSSI signal is the power of the incoming signal measured in dBm after it is mixed down to an intermediate frequency $f_{IF}$. It is then low pass filtered with cutoff frequency $f_{cut}$ ($f_{cut} << f_{IF}$). This filtered signal is denoted by $r(t)$.

Theorem 1. Let $f_1 > f_2$ be two close carrier frequencies with $\delta = (f_1 - f_2)/2$, $\delta << f_2$, and $2\delta < f_{cut}$. Furthermore, it is assumed that a node receives the radio signal $$s(t) = a_1 \cos(2\pi f_1 t + \phi_1) + a_2 \cos(2\pi f_2 t + \phi_2) + n(t),$$

where $n(t)$ is Gaussian noise. Then the filtered RSSI signal $r(t)$ is periodic with fundamental frequency $f_1 - f_2$ and absolute phase offset $\phi_1 - \phi_2$.

PROOF: If the noise is temporarily neglected, then the mixed down intermediate frequency signal $s_{IF}(t)$ is $$s_{IF}(t) = a_1 \cos[2\pi(f_{IF} + \delta)t + \phi_1] + a_2 \cos[2\pi(f_{IF} - \delta)t + \phi_1]. \quad (1)$$

To obtain the signal power:

$$s_{IF}^2(t) = a_1^2 \cos^2[2\pi(f_{IF} + \delta)t + \varphi_1] + a_2^2 \cos^2[2\pi(f_{IF} - \delta)t + \varphi_2] + \quad (2)$$
$$2a_1 a_2 \cos[2\pi(f_{IF} + \delta)t + \varphi_1] + \cos[2\pi(f_{IF} + \delta)t + \varphi_1].$$

Using the following trigonometric identities:

$$\cos^2(x) = \frac{1 + \cos(2x)}{2}$$

and $$\cos(x)\cos(y) = \frac{\cos(x+y) + \cos(x-y)}{2},$$

it is obtained that:

$$s_{IF}^2(t) = \quad (3)$$
$$\frac{a_1^2 + a_2^2}{2} + a_1^2 \cos^2[4\pi(f_{IF} + \delta)t + 2\varphi_1] + a_2^2 \cos^2[4\pi(f_{IF} - \delta)t + 2\varphi_2] +$$
$$a_1 a_2 \cos[4\pi f_{IF} t + \varphi_1 + \varphi_2] + a_1 a_2 \cos[4\pi \delta t + \varphi_1 - \varphi_2]$$

where $(a_1^2 + a_2^2)/2$ is the DC component.

Due to the nonlinear logarithmic distortion applied to $s_{IF}^2(t)$, the resulting signal contains several new frequency components. They are the linear combinations of the frequency components $(i \cdot 2\delta + j \cdot 2f_{IF})$ in equation (3), where i and j are non-negative integers.

The low pass filter eliminates all high frequency components (j>0), thus $$r(t) = k \cdot \log\lfloor [(a_1^2 + a_2^2)/2 + \tilde{n}(t) + a_1 a_2 \cos(2\pi(2\delta)t + \phi_1 - \phi_2)] \rfloor, \quad (4)$$

where $\tilde{n}(t)$ is band limited Gaussian white noise, and k is a constant. Thus, the fundamental frequency of r(t) is $2\delta = f_1 - f_2$. As the logarithm does not change the phase, its absolute phase offset is $(\phi_1 - \phi_2)$. Note that the amplitude of the harmonics is significantly smaller than that of the fundamental component.

Theorem 2. Assume that two nodes A and B transmit pure sinusoid waves at two close frequencies $f_A > f_B$, such that $f_A - f_B < f_{cut}$, and two other nodes C and D measure the RSSI signal. Then the relative phase offset of and $r_C(t)$ and $r_D(t)$ is:

$$\frac{2\pi(d_{AD} - d_{BD} + d_{BC} - d_{AC})}{c/f} \pmod{2\pi}$$

PROOF: Let X be either A or B, and Y be either C or D. Denote by $t_X$ the time when node X starts to transmit, and by $a_{XY}$ the amplitude of the attenuated signal transmitted by X and received by Y. Then the received composite signal at node Y is $$s_Y(t) = a_{AY}\cos\left[2\pi f_A\left(t - t_A - \frac{d_{AY}}{c}\right)\right] + \quad (5)$$
$$a_{BY}\cos\left[2\pi f_B\left(t - t_B - \frac{d_{BY}}{c}\right)\right] + n(t)$$
$$= a_{AY}\cos\left[2\pi f_A t - 2\pi f_A\left(t_A + \frac{d_{AY}}{c}\right)\right] +$$
$$a_{BY}\cos\left[2\pi f_B t - 2\pi f_B\left(t_B + \frac{d_{BY}}{c}\right)\right] + n(t),$$

after sufficient amount of time, that is when t is greater than $t_A + d_{AY}/c$ and $t_B + d_{BY}/c$. Using Theorem 1, the absolute phase offset of the envelope signal $r_Y(t)$ is $$\theta_Y = -2\pi f_A\left(t_A + \frac{d_{AY}}{c}\right) + 2\pi f_B\left(t_B + \frac{d_{BY}}{c}\right) \quad (6)$$

Accordingly, the relative phase offset between $r_C(t)$ and $r_D(t)$ is $$\theta_C - \theta_D = -2\pi f_A\left(t_A + \frac{d_{AC}}{c}\right) + 2\pi f_B\left(t_B + \frac{d_{BC}}{c}\right) + \quad (7)$$
$$2\pi f_A\left(t_A + \frac{d_{AD}}{c}\right) - 2\pi f_B\left(t_B + \frac{d_{BD}}{c}\right)$$
$$= 2\pi(f_A/c)(d_{AD} - d_{AC}) + 2\pi(f_B/c)(d_{BC} - d_{BD}).$$

From the above equation, the statement of the theorem immediately follows.

For wireless sensor nodes, due to their limited range and high carrier frequency relative to their cutoff frequency, the formula of the measured relative phase offset can be simplified. This gives the precursor of the definition of range following the next theorem.

Theorem 3. Assume that two nodes A and B transmit pure sine waves at two close frequencies $f_A > f_B$, and two other nodes C and D measure the filtered RSSI signal. If $f_A - f_B < 2$ kHz, and $d_{AC}, d_{AD}, d_{BC}, d_{BD} \leq 1$ km, then the relative phase offset of $r_C(t)$ and $r_D(t)$ is $$\frac{2\pi(d_{AD} - d_{BD} + d_{BC} - d_{AC})}{c/f} \pmod{2\pi}$$

where $\delta = (f_A + f_B)/2$.

PROOF: Using $\delta = (f_A - f_B)/2$ and the conclusion of Theorem 2, $(\theta_C - \theta_D)$ can be rewritten as $$\theta_C - \theta_D = \quad (8)$$
$$\frac{2\pi(d_{AD} - d_{AC} + d_{BC} - d_{BD})}{c/f} + \frac{2\pi(d_{AD} - d_{AC} - d_{BC} + d_{BD})}{c/\delta} \pmod{2\pi}.$$

According to the assumption $\delta \leq 1$ kHz, $c/\delta \geq 300$ km, therefore, the second term in the right hand side of the equation (8) can be disregard.

For any four nodes A, B, C and D, $$d_{ABCD} = (d_{AD} - d_{BD} + d_{BC} - d_{AC}), \quad (9)$$

and for any frequency f $$\theta_{ABCD}(f) = \frac{2\pi d_{ABCD}}{c/f}, \pmod{2\pi}. \quad (10)$$

Therefore, $\theta_{ABCD}(f)$ can be effectively measure, which equals $d_{ABCD}$ modulo the wave length of the carrier frequency. By making multiple measurements with different carrier frequencies, one can reconstruct the value of $d_{ABCD}$, which is the principal ranging data of RIPS. It is trivial to verify that the following identities hold $$d_{ABCD} = -d_{BACD} = -d_{ABDC} = d_{CDAB} \quad (11)$$

Note that in Theorem 3, it is explicitly assumed that $f_A > f_B$. If the opposite holds, then the frequency of the envelope signal becomes $|f_A - f_B|$ and its phase offset $2\pi - \theta_{ABCD}(f)$. This follows from the fact that $d_{ABCD} = -d_{BACD}$.

Theorem 4. In a network of n nodes there are at most $3(n-2)(n-3)/2$ independent interference measurements that can be made.

PROOF: Fixing two nodes X and Y of the wireless sensor network, and considering the following two classes of ranges (M1) $d_{XUYV}$, where X, Y, U, V are all different nodes, and (M2) $d_{XYUV}$, where X, Y, U, V are all different nodes and U<V in some fixed linear order.

Clearly, there are (n−2)(n−3) ranges of the first type (M1) and one half of this number in the second type (M2). This gives $3(n-2)(n-3)/2$ independent measurements. All other ranges can be calculated from these measurements.

Taking nodes A, B, C and D, it is verified that $$\begin{pmatrix} d_{XAYC} - d_{XBYC} + \\ d_{XBYD} - d_{XAYD} \end{pmatrix} = (d_{XC} - d_{AC} + d_{AY} - d_{XY}) - \quad (12)$$

$$(d_{XC} - d_{BC} + d_{BY} - d_{XY}) +$$

$$(d_{XD} - d_{BD} + d_{BY} - d_{XY}) -$$

$$(d_{XD} - d_{AD} + d_{AY} - d_{XY})$$

$$= (d_{AD} - d_{BD} + d_{BC} - d_{AC})$$

$$= d_{ABCD}$$

This proves that every range can be calculated from ranges of the form $d_{XUYV}$ where U and V are arbitrary nodes. However, not all these are directly measurable, because for example X cannot be the same node as U or V. The two degenerate cases are $$d_{XXYU} = d_{XU} + d_{XY} d_{XY} = 0 \text{ and}$$

$$d_{XUYY} = d_{XY} - d_{UY} + d_{UY} - d_{XY} = 0$$

Therefore, $d_{ABCD}$ can be calculated from ranges from class (M1) whenever X≠C, D and Y≠A, B.

Using the equation $d_{ABCD} = d_{CDAB}$, equation (12) can be rewritten as $$d_{XCYA} - d_{XCYB} + d_{XDYB} - d_{XDYA} = d_{ABCD} \quad (14)$$

which allows one to calculate $d_{ABCD}$ whenever X≠A, B and Y≠C, D. If neither (12) nor (14) can be used to calculate $d_{ABCD}$ then it must be the case that {X, Y}={A, B} or {X, Y}={C, D}. In these cases, however, $d_{ABCD}$ can be directly obtained from a measurement in class (M2) using equations (11).

It is further noted that Theorem 4 gives only an upper bound on the number of linearly independent set of measurable ranges in an n-node network. Recently, Lambert Meertens has reported a sharp bound that is n(n−3)/2 [12].

Notice that any solution to the resulting system of equations is invariant under translations, rotations and reflection. Therefore, the number of unknowns is 2n−3 in 2D and 3n−6 in 3D. In a 6-node network there are 9 linearly independent measurements, using the sharp bound, just enough for the 9 unknowns. However, at least 8 nodes in 3D are needed to get more measurements (20) than the number of unknowns (18).

One aspect of the present invention provides a method for radio interference based sensor localization in a wireless sensor network. The wireless sensor network has a plurality of spatially separated sensor nodes with each capable of transmitting and/or receiving a signal. In one embodiment, the method includes the following steps: at step (a), a first sensor node and a second sensor node are selected as a pair of transmitters and each of the remaining sensor nodes is selected as a receiver in the wireless sensor network, respectively. At step (b), a first signal and a second signal are transmitted from the selected first sensor node and the selected second sensor node, respectively, to the wireless sensor network, where the first signal has a frequency, $f_1$, and the second signal has a frequency, $f_2$, the frequencies $f_1$ and $f_2$ being substantially close to each other such that a superposition of the first signal and the second signal in a position of space where a receiver is located results in an interference signal. At step (c), the interference signal received by each of the receivers is used to estimate a phase offset of the received interference signal at the corresponding receiver, respectively. At step (d), a difference of the phase offsets of the interference signal for a pair of receivers is obtained. (e) a distance range between the pair of transmitters and the corresponding pair of receivers is calculated from the obtained difference of phase offsets of the interference signal for the pair of receivers. Then steps (d) and (e) are repeated for the remaining receivers to obtain a set of the distance ranges at step (f). At step (g), relative positions of the plurality of spatially separated sensor nodes in the wireless sensor network are localized from the set of the distance ranges, where the distance range is a function of distances between the pair of transmitters and the corresponding pair of receivers.

The method further includes the step of calibrating the pair of transmitters to simultaneously transmit the first signal and the second signal, respectively. The method also includes the step of synchronizing start times of signal transmissions and/or receptions at different sensor nodes of the wireless sensor network before a sensor node transmits and/or receives a signal at a predetermined frequency. Moreover, the method may include the step of performing a frequency tuning algorithm to determine a radio frequency setting for the pair of transmitters to transmit the first and second signals with a frequency difference substantially close to zero. The frequency tuning algorithm includes the steps of transmitting a first signal at a frequency varied at a fine-grain step and a second signal at a fixed frequency from a first and second transmitters of the pair of transmitters, respectively, and analyzing a frequency of the interference signal received by a receiver to determine the frequency of the first signal for which the frequency of the interference signal substantially close to zero, where the frequency of the interference signal is coincident with the frequency difference of the first signal and the second signal. The frequency tuning algorithm also includes the step of propagating information of the analyzed frequency back to the first transmitter by the receiver, thereby causing the first transmitter to determine the radio frequency setting of the pair of transmitters for which the frequency of the interference signal is within a predetermined range.

In one embodiment, the localizing step is performed with a genetic algorithm. The selecting step is performed with a base station.

Another aspect of the present invention provides a method for radio interference based sensor localization. In one embodiment, the method comprises the steps of creating an interference signal from a first transmitter and a second transmitter, measuring phase offsets of the interference signal received by a first receiver and a second receiver, respectively, and determining the locations of the first and second transmitters and the first and second receivers from the measured phase offsets. The first and second transmitters and the first and second receivers are spatially separated and communicate to each other wirelessly. In one embodiment, the first and second transmitters are configured to transmit a pair of radio frequency signals having a frequency difference substantially close to zero.

An alternative aspect of the present invention relates to software stored on a computer readable medium for causing a computing system to perform radio interference based sensor localization in a wireless sensor network according to the invented methods as disclosed above.

In one aspect, the present invention relates to a radio interferometric positioning system (hereinafter "RIPS") for sensor localization. The RIPS in one embodiment has a sensor network having a number, N, of spatially separated sensor nodes, N being an integer, wherein the number N of spatially separated sensor nodes have a first transmitter node and a second transmitter node for transmitting a first signal and a second signal, respectively, to the sensor network, and (N-2) receiver nodes. The first signal has a frequency, $f_1$, and the second signal has a frequency, $f_2$, the frequencies $f_1$ and $f_2$ being substantially close to each other such that a superposition of the first signal and the second signal in a position of space where a receiver node is located results in an interference signal. In one embodiment, the number N of spatially separated sensor nodes are located in a 2-dimension configuration. The number N of spatially separated sensor nodes, in another embodiment, are located in a 3-dimension configuration. The number N of spatially separated sensor nodes communicate to each other wirelessly. In one embodiment, each of the number N of spatially separated sensor nodes comprises a radio chip. The radio chip is capable of transmitting a radio frequency signal in a predetermined frequency band at different power levels, transmitting the radio frequency signal with a short-term stability of the frequency, tuning the frequency of the radio frequency signal in fine-grain steps, and precisely capturing the interference signal. In one embodiment, each of the first and second signals comprises a radio frequency wave. The frequency $f_1$ of the first signal and the frequency $f_2$ of the second signal are in the range of radio frequency from about 3 Hz to about 3,000 GHz.

Furthermore, the system has a base station for communicating with the number N of spatially separated sensor nodes in the sensor network and processing information received from the number N of spatially separated sensor nodes so as to localize the number N of spatially separated sensor nodes. In one embodiment, the base station comprises a computer.

These and other aspects of the present invention are more specifically described below.

EXAMPLES OF THE INVENTION

Without intent to limit the scope of the invention, further exemplary methods and their related results according to the embodiments of the present invention are given below. Note again that titles or subtitles may be used in the examples for convenience of a reader, which in no way should limit the scope of the invention. Moreover, certain theories are proposed and disclosed herein; however, in no way they, whether they are right or wrong, should limit the scope of the invention.

In one embodiment, a MICA2 mote platform with the TinyOS operating system [16, 17] is utilized. As described above, two nodes need to be selected to transmit sinusoid waves (or other waveforms) at close frequencies to produce the interference signal. A distance measurement related to the relative positions of the two transmitters and two receivers can be inferred from the phase offset differences of the periodic signal observed at the receivers. It is necessary to measure phase offset differences at multiple frequencies for calculating the distance range from the noisy data. Specifically, one exemplary RIPS implementation includes the following steps: a) a pair of sensor nodes are selected from a group of sensor nodes as a pair of transmitters and each of the remaining sensor nodes in the group of sensor nodes is selected as a receiver, respectively, where the group of sensor nodes is selected from the wireless sensor network such that the sensor nodes in the group are located within a spatial range; b) transmission times for the pair of transmitters to transmit a pair of signals are scheduled, where the pair of signals create an interference signal in a position of space where a receiver is located, and wherein the interference signal has an interference range coincident with the spatial range; c) the pair of transmitters are calibrated to simultaneously transmit the pair of signals at frequencies within a radio frequency setting at the scheduled transmission times, wherein the frequencies of the pair of signals vary according to a fine-grain step at different transmission times; d) the pair of signals at the frequencies are transmitted from the pair of transmitters at the scheduled transmission times; e) received signal strength indicator (RSSI) samples of the interference signal at each of the receivers are analyzed so as to estimate the frequency and phase offset of the interference signal, respectively; f) a difference of the phase offsets of the interference signal for a pair of receivers is obtained; g) a distance range between the pair of transmitters and the pair of receivers is calculated from the obtained difference of phase offsets of the interference signal for each pair of receivers to obtain a set of the distance ranges; and h) relative positions of the group of sensor nodes in the wireless sensor network are localized from the set of the distance ranges where the distance range is a function of distances between the pair of transmitters and the corresponding pair of receivers. In one embodiment, each of the pair of signals comprises a sine wave. Furthermore, the method comprises the step of repeating steps a)-h) for the rest of the plurality of spatially separated sensor nodes in the wireless sensor network.

In one embodiment, part of the frequency tuning process, the selection and scheduling of the transmitter pairs, the calculation of the $d_{ABCD}$ range from multiple phase offset readings and the localization itself are running on a base station. The base station can be a computer and/or a controller. Software components running on the motes include a custom driver for the Chipcon CC1000 (Chipcon AS, Oslo, Norway) radio chip that allows the pure sine wave transmission at a particular frequency, a radio engine component that coordinates and synchronizes the participating nodes and handles the transmission of the sine waves and reception of the interference signal, and a signal processing component that estimates the frequency and phase offset of the sampled RSSI signal.

CC1000 Characteristics: In one embodiment, the sensor nodes are equipped with the Chipcon CC1000 radio chip configured to transmit in a 433 MHz frequency band. The following features provided by the radio chip are essential to the implementation of the method of radio interferometric geolocation:

capability to transmit an unmodulated sine wave in a reasonably wide frequency band (between 400 MHz and 460 MHz), as well as the ability to tune the frequency of the transmitter in fine-grain steps (65 Hz), short-term stability of the frequency of the unmodulated sine wave (for less than 29 ms time period), relatively precise capture of RSSI with only a small delay jitter, and capability to transmit at different power levels.

The relatively wide frequency band is necessary for calculating the actual range from the phase offset differences, as described below. The fine-grained frequency tuning is needed to achieve the frequency separation for the two transmitters, as required by Theorem 3. The short-term stability of the carrier frequency is required because the frequency and phase offset analysis at the receivers uses averaging over multiple periods to increase the signal-to-noise ratio (hereinafter "SNR"). The timing precision of the measured RSSI signal is also critical because the RSSI measurement delay affects the relative phase offset error as discussed above. Additionally, transmission at different power levels is required since the distance of the two transmitters from a receiver can vary up to the point where the closer transmitter completely overwhelms the signal from the more distant one.

Even though the radio chip is highly configurable with many favorable properties, it has certain limitations that need to be overcome: (i) the frequency synthesizer is not accurate enough, which has up to 4 kHz carrier frequency deviations that depended on the temperature and voltage level, and (ii) the delays of the calibration, as well as encoding and decoding of the digital signals in the radio chip introduce delays with a considerably large variance (up to one hundred microseconds).

In one embodiment, the radio timing fluctuations are eliminated by using a time synchronization scheme, which is external to the radio chip. It is also important to overcome the carrier frequency inaccuracy because the interference frequency needs to fall within a small range. A frequency tuning algorithm that determines the radio parameters for the transmitters corresponding to a frequency separation of close to 0 Hz is implemented. The algorithm is run frequently, i.e., once for each transmitter pair, to overcome the dependency of the generated frequency on the current temperature and voltage.

Time Synchronization: In order to obtain or measure the relative phase offset of the RSSI signals between different receivers, the nodes need to be synchronized to a common time instant for measuring the absolute phase offsets. After collecting the absolute phase offsets from the receivers, the relative phase offsets can be calculated by subtracting them from each other. In one embodiment, a proper synchronization strategy is disclosed. The synchronization protocol is not for network-wide time synchronization, but synchronizes the sensor nodes participating in the current ranging round only and only for the duration of a single measurement.

Before a sensor node can transmit or receive a radio signal at a particular frequency, it needs to acquire the radio chip from the standard MAC (common medium access) layer and calibrate it to that frequency. Once the chip is acquired, no further inter-node communication is possible, so the participating nodes have to follow a predefined schedule starting from a precise time instant to stay synchronized. This scheduling is challenging because the time required for performing most operations with the radio, such as acquisition and calibration, has a significant variance. The crucial operation is the sampling of the RSSI signal that needs to be aligned with a couple of microseconds precision across the receivers.

Figure 2:
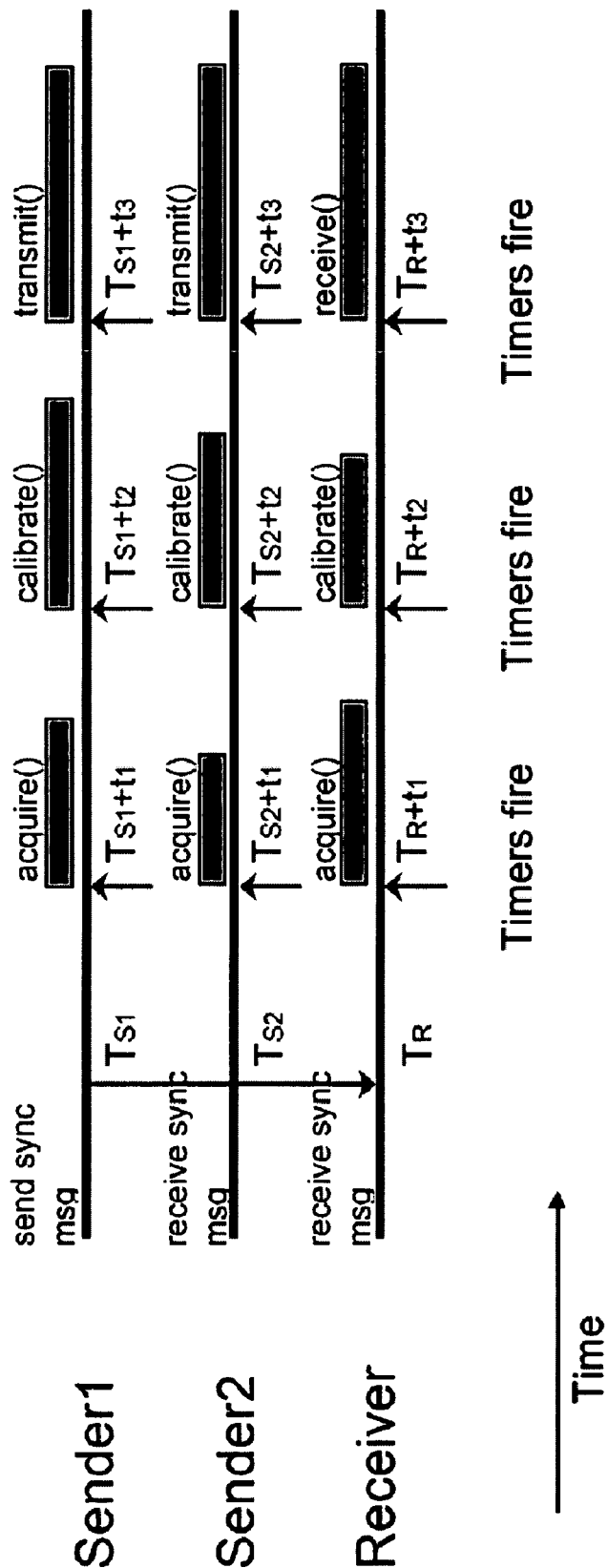
FIG. 2 shows an external synchronization scheme built on top of a radio driver that aligns start times of signal transmission and reception at multiple sensor nodes according to one embodiment of the present invention.

The timing uncertainties in the radio chip are mitigated by imposing an external synchronization protocol depicted in FIG. 2. According to this protocol, a master node initiates the measurement by broadcasting a radio message, which identifies the other sender node, the type of measurement (tuning or ranging) and the transmit powers. The message also specifies a time instant in the future—in the local time of the master—when the measurement must be started. Finally, the radio stack attaches a precise timestamp to the packet, when it is sent from the mote. Each receiver converts the synchronization point to its local time by using the arrival timestamp of this message. The converted value is used to set up a local timer and is re-broadcasted. This simple protocol enabled us to extend interferometric measurements beyond the data communication range. It was shown in [15] that it is possible to set up synchronization points this way with microsecond accuracy on the MICA2 platform. After the synchronization point, calibration and signal transmission/reception at fixed times start. The combined error of synchronization and clock skew over a time period of less than 1 second is still just a few microseconds.

The external synchronization ensures that the receivers and transmitters receive and send commands to the radio chip at the same time. This does not necessarily mean that the receivers start receiving data from the A/D converter at the same time. To compensate for this, each receiver records the times when the RSSI samples arrived and adjusts the measured absolute phase accordingly.

Tuning: The CC1000 radio chip needs to perform internal calibration of the frequency synthesizer PLL to adjust it to the frequency and compensate for supply voltage and temperature variations. The self-calibration is a time consuming process that takes up to 34 ms according to the Chipcon datasheet [18]. Moreover, since the PLL can generate only a limited scale of frequencies, it is advised to recalibrate it for frequencies more than 1 MHz apart. Additionally, it is useful to index the available frequency band (400 MHz to 460 MHz) by frequency channels, so that transmitting on a different channel mandates recalibration. In the exemplary embodiment, channel 0 is defined to be at 430.1 MHz and the channel separation to be approximately 0.526 MHz.

A key benefit of CC1000 radio chip is that the PLL can generate different frequencies at a very fine frequency resolution (65 Hz) once calibrated to a particular channel. By indexing these fine-grained frequencies with frequency tuning, no recalibration is required when changing the tuning parameter. In the exemplary embodiment, the nominal frequency f can be then obtained from the channel and tuning parameters the following way:

$$f = 430.1 + 0.526 \text{ channel} + 65 \cdot 10^{-6} \text{ tuning}.$$

One of the limitations of the radio chip is that the calibrated frequency for a specific channel differs from the expected value by up to 4 kHz. Since the frequency range accurately is limited by the time constraint for a measurement (29 ms) as well as the limited sampling rate of the RSSI signal on MICA2 platform (9 kHz), the difference between the transmission frequencies needs to be in the range of 200 Hz to 800 Hz.

Figure 3:
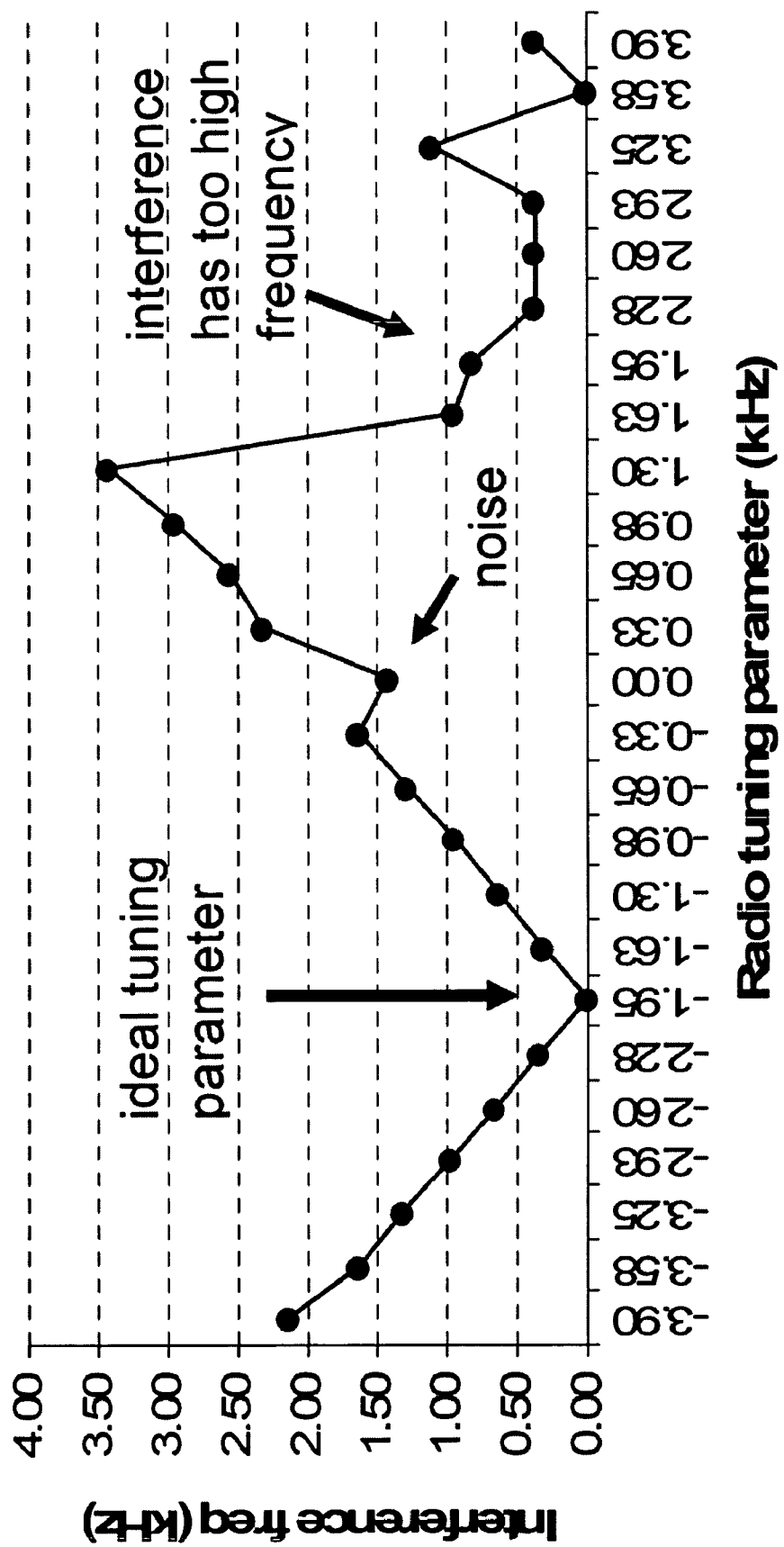
FIG. 3 shows a frequency of an interference signal at a receiving node according to one embodiment of the present invention.

The frequency tuning algorithm determines the radio settings for the transmitters corresponding to the same frequency. Let the transmitters be set to the same channel and $f_1$, $f_2$ be the actual signal frequencies. The maximum carrier frequency error is found to be less than 2 kHz, thus $|f_1 - f_2| < 2 \cdot 2 \text{ kHz} = 4 \text{ kHz}$. The first transmitter emits a sine wave at the frequencies $f_1(i) = f_1 + i \cdot 325$ Hz, $i = -15, -14, \ldots, 15$ using the tuning capability of the radio chip, while the second transmitter keeps transmitting at the frequency $f_2$. A receiver node analyzes the frequency of the interference signal which is $f_1(i) - f_2$, as shown in FIG. 3. Using the known step size (325 Hz), the receiver can filter out the noise and faulty frequency measurements and determine the value of i for which the interference frequency is close to 0. The receiver propagates this information back to the first transmitter who consequently determines the settings for the radio chip such that the interference frequency is in the required range.

It should be noted that the calibration error for two nodes does not stay constant for different channels. Observing it at two channels 50 MHz apart, it is shown up to 300 Hz change. However, as the calibration error is mostly caused by the frequency error of the oscillator that drives the radio chip, it is approximately linear in frequency. Therefore, the correct tuning parameter for two different channels can be measured and these values to obtain the radio parameters for other channels can be interpolated.

Frequency and Phase Estimation: Due to the limited communication bandwidth, the sampled RSSI values need to be processed on the motes. The signal processing algorithm estimates the frequency and the phase of the RSSI signal and transmits these along with a quality indicator of the measurement to the base station. The algorithm is divided to online and post-processing parts. The online part is executed upon each A/D converter interrupt for 256 consecutive samples. Afterwards, more extensive post-processing is performed on the data computed in the online phase.

Hardware limitations on the mote make computationally expensive signal processing techniques prohibitive. The A/D converter sampling rate (9 kHz) and the clock frequency of the 8 bit microcontroller (7.4 MHz), allows roughly 820 CPU cycles per sample for online processing. Post processing is limited by a somewhat less strict deadline: several measurements are made between time synchronization points, leaving around 10,000 cycles per measurement for post-processing. The lack of floating point hardware support and memory space constraints further restricts the domain of feasible algorithms. The use of standard, but computationally expensive solutions, such as Fourier analysis or autocorrelation is not feasible.

Figure 4:
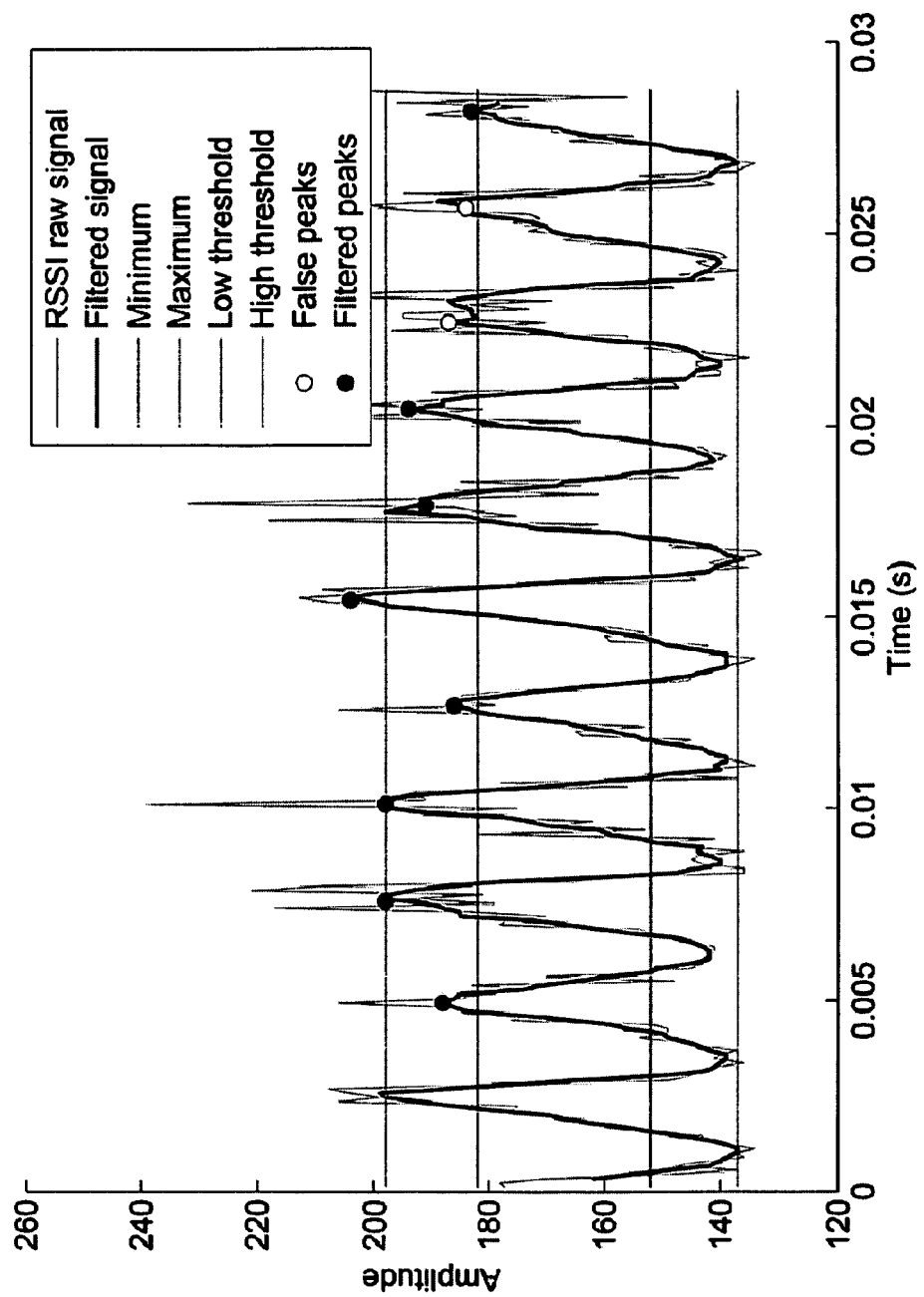
FIG. 4 shows a peak detection and filtering result according to one embodiment of the present invention.

FIG. 4 shows a representative RSSI signal recording by a mote. Peak detection is performed online in the A/D converter interrupt routine, which eliminates the need of large sample buffers and shortens the post-processing time. First, the raw samples are filtered by a moving average component in order to enhance the SNR. Next the minimum and maximum signal values—essential parameters to the adaptive peak detection algorithm—are acquired from the leading 24 samples. This first part of the data series is long enough to contain at least one full period. The acquired amplitude value serves as a quality indicator of the measurement. Then samples above or below a threshold currently set to 70% of the maximum or minimum values are identified as high or low amplitudes in the filtered signal. Peaks are defined as center points of two consecutive high level threshold crossings (non-high→high followed by a high→non-high step). Peaks are discarded in this phase if the signal has not crossed the low threshold since the last peak, minimizing the risk of false positive detections.

The post-processing phase works exclusively on peak indexes, identified and stored by the online algorithm. After it determined the shortest period between subsequent peaks, it accumulates the sum of the periods that are not longer then 130% of the shortest one (to compensate for the very rare false positive detections in the first phase). Peaks on both ends of an outlier period are marked as false peaks and discarded in later calculations. This simple and draconian rule might throw out good peaks, a small price to pay for rejecting false peaks, which could significantly impair the phase calculation. Frequency is calculated as the reciprocal of the average period length.

The phase of the RSSI signal is estimated by the average phase of the filtered peaks. Since small errors in the frequency estimation can result in a significant error in the phase calculation, the phases relative to the center of the sample buffer is computed, thereby reducing the accumulated phase error due to an inaccurate frequency estimate [17]. The algorithm also employs a basic phase unwrapping method to average values near 0 and $2\pi$ properly.

Since floating point calculations are prohibitive on the mote, hand optimized fixed point arithmetic is used through out in the frequency and phase computations. The estimated frequency, phase and amplitude are finally sent back to the base station.

Scheduling: There are two levels of scheduling involved in the interference measurement process:

(i) High level scheduling is responsible for selecting the pair of transmitters and should minimize the number of interference measurements while producing enough independent measurements to localize nodes uniquely in 3-dimensions. As given in Theorem 3 as described above, for a group of n nodes that form a single hop network, there are at most $n(n-3)/2$ choices for the independent interference measurements. The number of unknowns is $3n-6$ in 3-dimensional localization, so for groups of nodes larger than 8, an over-determined system of equations is obtained. In one embodiment, the base station selects all possible pairs of transmitters and all other nodes act as receivers.

(ii) Low level scheduling coordinates the activities of the two transmitters and multiple receivers. The frequency tuning algorithm and the phase offset estimation process described earlier in this section both involve multiple steps that require proper frequency calibration and timing. In the exemplary embodiment, 13 different frequency channels 5 MHz apart are used between 400 and 460 MHz. Furthermore, the scheduler executes the phase offset measurement with the same pair of transmitters, but different radio power settings to compensate for the effect of one transmitter being much closer to a receiver than the other. In the exemplary embodiment, three combinations are used: full power/full power or the two combinations of full power/half power.

RANGE CALCULATION

Figure 5:
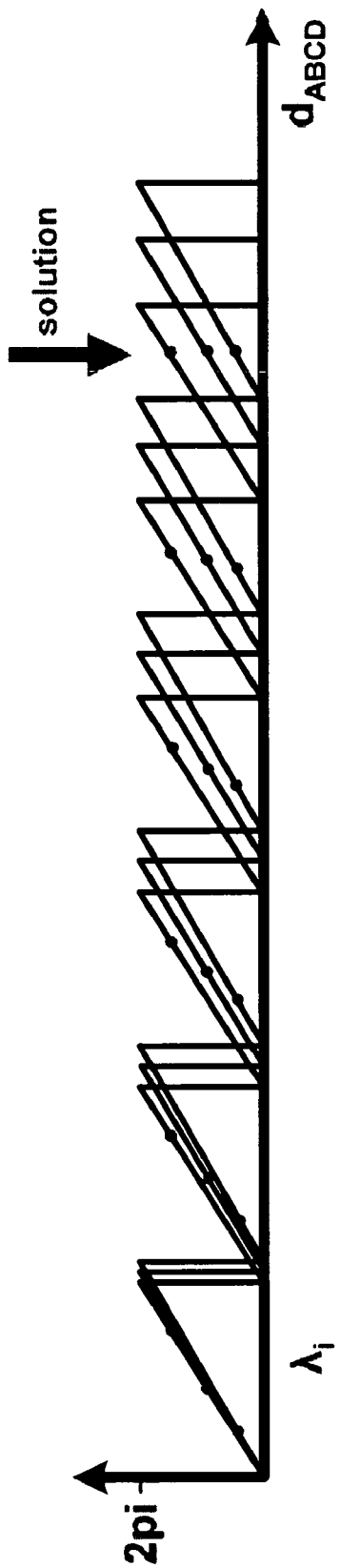
FIG. 5 shows a range calculation from phase offsets of interference signal according to one embodiment of the present invention.

From a set of phase measurements the following Diophantine equations can be formulated as $$d_{ABCD} = \lambda_i n_i + \gamma_i = \lambda_j n_j + \gamma_j \tag{15}$$

where $\lambda_i = c/f_i$ is the wavelength, $\lambda_i = \lambda_i \theta_i / 2\pi$ $\phi$ is the phase offset relative to the wave length, $\theta_i$ is the measured phase offset, and $n_i$ is an integer. A set of $\lambda_i$'s is needed so that their least common multiple is larger than the possible domain of $d_{ABCD}$. In case of the 433 MHz band, having 5 MHz separation means that three different measurements are enough assuming perfect phase estimation. The concept is illustrated in FIG. 5.

The phase measurements may have significant error, so the Diophantine equations become invalid. They can be reformulated into inequalities $$|(\lambda_i n_i + \gamma_i) - (\lambda_j n_j + \gamma_j)| < \epsilon, \tag{16}$$

where $\epsilon$ is a fraction of the wavelength determined by the phase measurement accuracy. This inequality set can be solved and the $d_{ABCD}$ solution defined as the mean of the individual $d_i = \lambda_i n_i + \gamma_i$ values. However, there may be multiple solutions resulting in more than one $d_{ABCD}$ values differing by integer multiples of the wavelength approximately. An error function can be defined as $$\text{error} = \sqrt{\Sigma(d_{ABCD} - d_i)^2} \tag{17}$$

The solution with the minimum error value becomes the final $d_{ABCD}$ estimate. The more number of different frequencies are used the better the estimate is. Instead of the necessary three, typically, between 10 and 20 different frequencies are used.

LOCALIZATION

Since the RIPS ranging method does not provide range estimates between pair of nodes directly, but a combination of distances among four nodes, none of the existing localization methods is directly applicable. Solving the large number of nonlinear equations would be somewhat cumbersome and not scale well. Instead, as a first cut at the localization problem, an optimization method based on genetic algorithms (hereinafter "GA") is used, which enables to evaluate the ranging method in the context of overall localization accuracy and provide a baseline localization method. GAs are based on a biological metaphor to find approximate solutions to difficult-to-solve problems through application of the principles of evolutionary biology to computer science, as known to people skilled in the art. Other algorithms can also be employed to practice the current invention.

Given a set of nodes with unknown locations and a set of $d_{ABCD}$ ranges, the goal is to find the relative positions of the nodes. An error function is defined over the node locations and a GA is used to find the node locations with the smallest error. GA follows the idea of Darwinian evolution and widely used as a general function optimization method. In one embodiment, the genetic algorithm includes the following steps: At step (i), a population of population-size random solutions is initially generated. At step (ii), a subset of population-size solutions randomly from the solutions is selected. Then, each solution in the subset is evaluated using an error function at step (iii), where the error function is defined over the node localizations. At step (iv), the solutions of the subset are sorted according to errors. At step (v), the worst 20% of the solutions of the subset are removed. At step (vi), new solutions are generated by selecting random parents from the best 20% of the rest of the subset and applying genetic operators on the parents. Then steps (ii)-(vi) are repeated until solutions for the relative localizations of the nodes are found.

A solution here is a placement of nodes. The error of the solution is defined as $$\text{error} = \frac{1}{n}\sqrt{\sum_{ABCD \in M}[d_{ABCD} - d_{ABCD}(s)]^2} \quad (18)$$

where $d_{ABCD}$ is measured range and $d_{ABCD}(s)$ is the calculated range in solution s.

A node placement is represented directly by a vector of the (x, y, z) coordinates of the nodes. When a new solution is being made the following genetic operators are applied:

(i) Crossing over: each node position is inherited from one of the two parents with even chance.

(ii) Mutations (all cases have equal chance): (a) Move one node by a Gaussian random number with a small $\epsilon$ variance, (b) Move one node to a random position, and (c) Move all nodes by the same Gaussian random number with a small $\epsilon$ variance.

The value of $\epsilon$ is set to the current value of the error function. It makes it possible for the nodes to do bigger "jumps" if the error is larger. When the error gets small the nodes can finely tune their positions this way.

This algorithm uses all the given ranges and tries to minimize the difference between the input range and the range in the solution. However, the input data has range estimates with relatively large errors corresponding to integer multiples of the wavelength distorting the solution. In one embodiment, the genetic representation of the solution is extended to include the set of used measurements and let the GA to optimize this set as well. This way the GA searches for the node positions and a set of good measurements simultaneously making it possible to eliminate all or most of the bad measurements. In the experiments this enhanced GA was able to reach the same accuracy as the one running on a data set where all input with large errors was removed manually.

EVALUATION

Effective Range: Determining the effective range of the radio interferometric ranging technique is not as straightforward as it is with methods relying on direct pairwise ranging. There are four nodes involved here and not only are there constraints on their pairwise distances, but also restrictions on the geometry of their arrangement. The maximum distance between a transmitter and a receiver is clearly related to the radio range. Interference signals are observed even when the receiver was far beyond the communication range of the transmitters at 160 meters using somewhat elevated motes. In the same setup the communication range was only 80 meters. That means that the interferometric technique can have twice the range as the digital communication implemented on the MICA2 mote using the same radio. In the remaining discussion we'll call this distance the interferometric radio range.

So far, only the maximum distance between a transmitter and a receiver has been concerned. There is no direct constraint on the distance between the two transmitters or the distance between the two receivers. However, by implication, they need to be within twice the interferometric radio range. Another important consideration is the ratio of the distances from a single receiver to the two transmitters. The received signal strength of one of the signals cannot be much larger than the other to generate a good quality interference signal. Tuning the transmitter output power can compensate for this, however. Note that this does not constrain the range of the given geometric arrangement of two transmitters and a receiver, since the given transmitter has to be close to the receiver if its signal can overwhelm the other signal. On the other hand, the same amplitude tuning needs to work for two receivers at the same time. Therefore, the second receiver needs to be in an area where the interference signal quality using the given amplitude tuning is still good enough. Furthermore, obstructions, multipath effects and other environmental conditions will adversely affect the effective range.

RIPS works with $d_{ABCD}$ range measures and not pairwise distances. What are the possible values $d_{ABCD}$ can take? Since all four terms in the equation are between 0 and the maximum interferometric radio range (r), it is easy to see that $$-2r \leq d_{ABCD} \leq 2r \quad (19)$$

Figure 8:
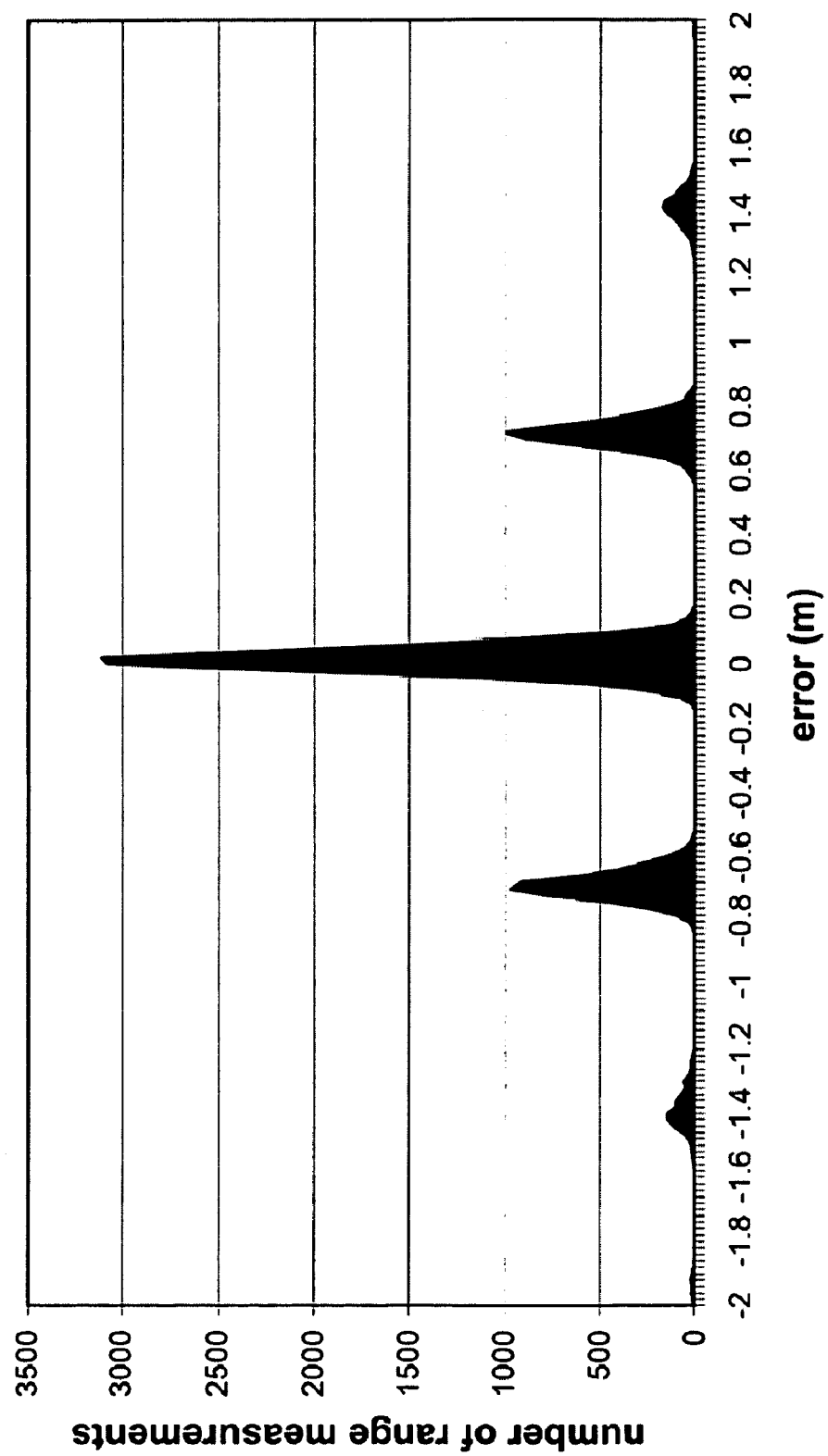
FIG. 8 shows an error distribution of all ranges according to one embodiment of the present invention.

System Setup: In one embodiment, a wireless sensor network having 16 nodes in a 4×4 grid is deployed in a flat grassy area with no obstructions. The overall area covered was 18×18 meters. In order to localize nodes in 2D you need 3 anchor points. They were picked randomly while making sure that they did not fall in a line. FIG. 8 shows a distribution of phase difference deviations at 400 Hz.

The grid was selected because of the relative ease of setting up the positions precisely. While measuring the edges with a tape measure can be done well enough, keeping all the angles right is harder. It is shown that the accuracy of node placement is within 5 cm.

Frequency and Phase Accuracy: The performance of the frequency and phase detection algorithm is comparable to a high resolution (1 Hz) DFT-based approach. The justification of DFT-based tone parameter estimation and its relationship to the maximum likelihood estimator can be found in [13].

Figure 6:
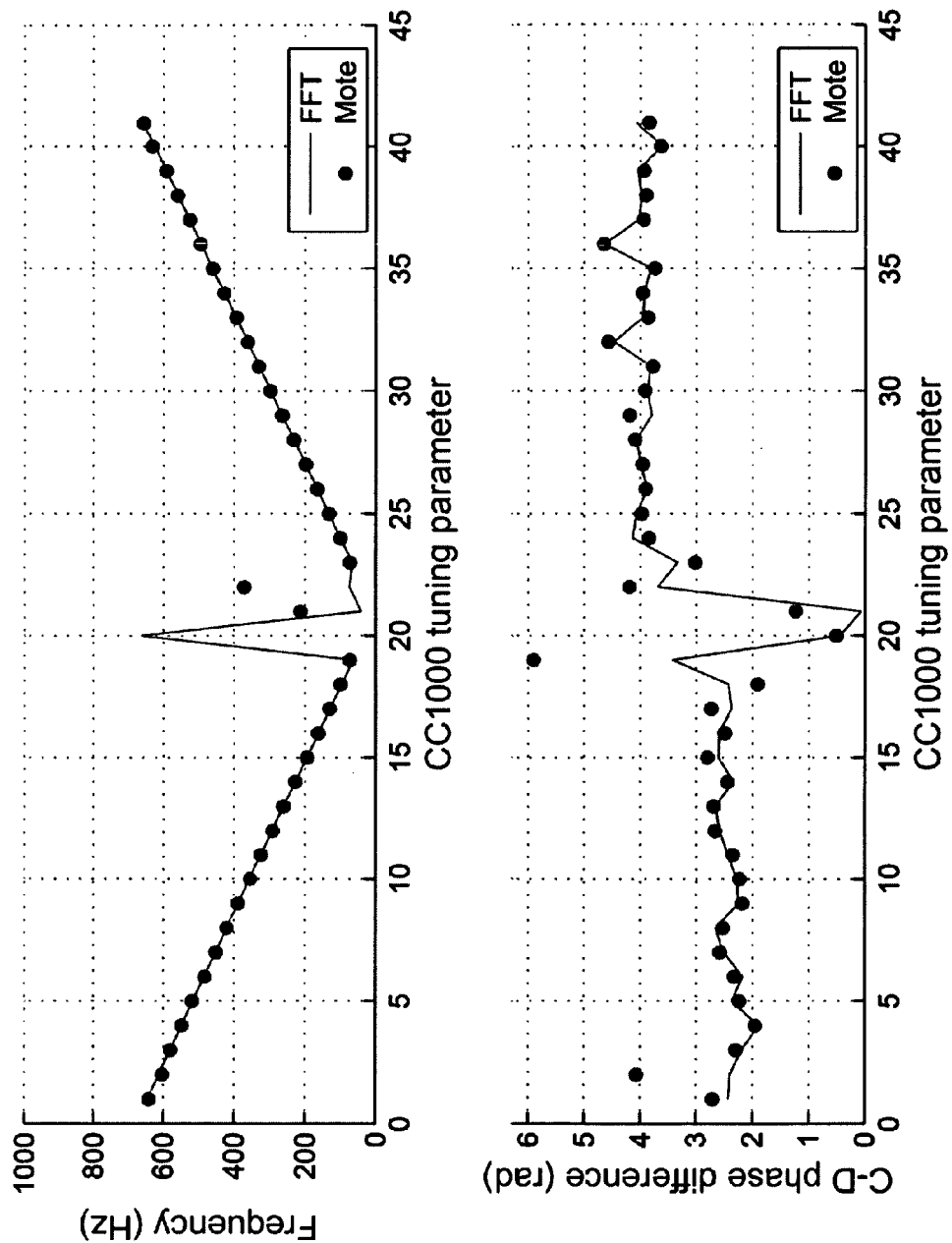
FIG. 6 shows a frequency and phase results and high resolution DFT estimation on different interference frequencies according to one embodiment of the present invention.

FIG. 6 shows frequency and phase difference results of frequency tuning observed on a pair of motes (one of the senders changed its carrier frequency in small increments). The number of RSSI samples (measurement interval) limits both approaches on low frequencies. In the "normal operation range" however, the mote implementation performs surprisingly well. On the frequency diagram both methods closely reveal the ideal "v-shaped" curve. Phase difference measurements have significantly more noise (the ideal response would be a constant value flapped at 0 Hz), as described above.

Figure 7:
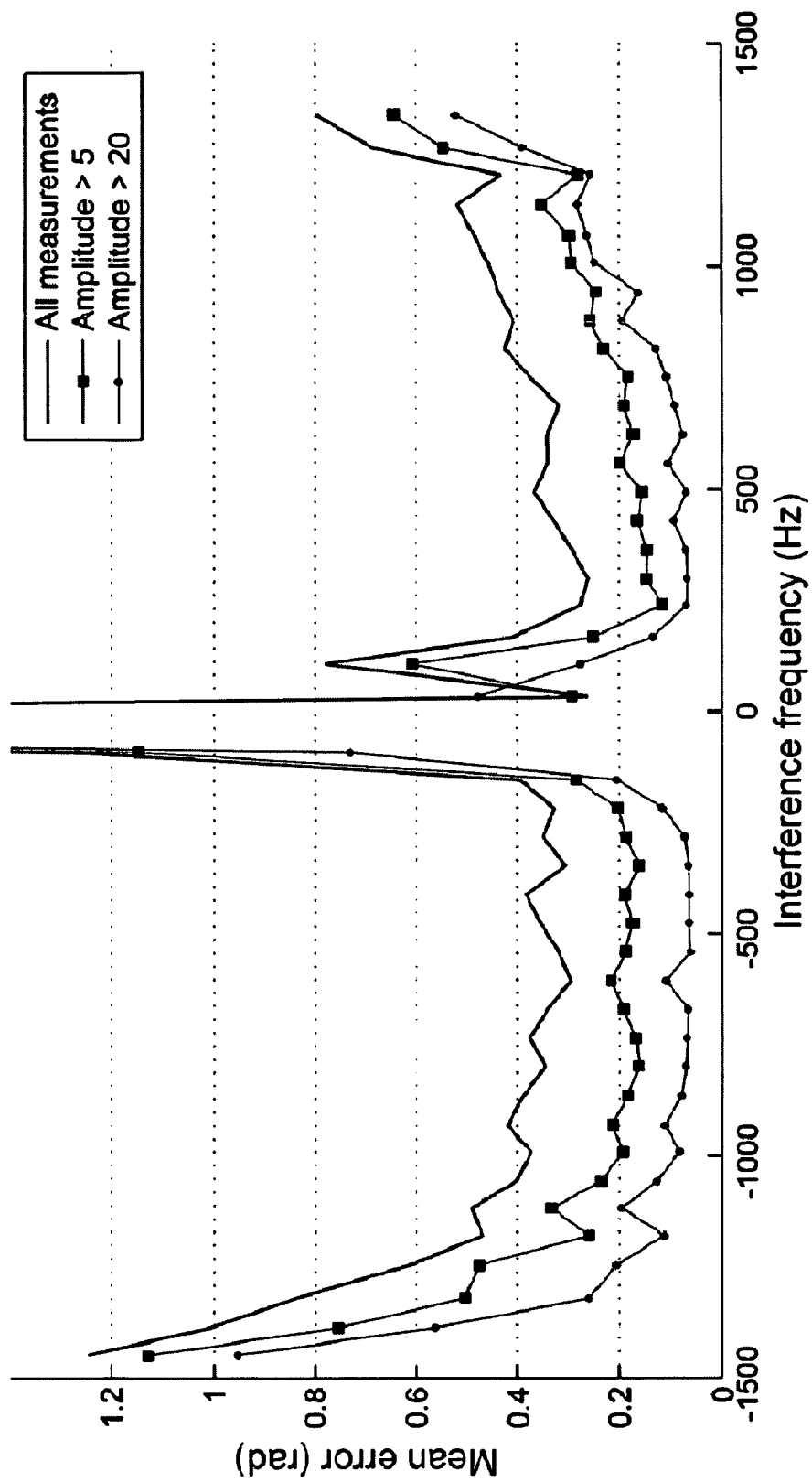
FIG. 7 shows mean deviations of phase measurements using different filtering thresholds according to one embodiment of the present invention.

The average error of phase difference measurement is illustrated on FIG. 7. In a 16-node network one pair of motes is fixed as senders and performed frequency tuning around 0 Hz interference. The same experiment is repeated 30 times. For all ($_2{}^{14}$) pairs the median phase and the average deviation are calculated on each frequencies (using at most 30 measurements). Next, the average value of these deviations is calculated. By using the amplitude value as a quality indicator of measurements for discarding poor ones, the average error can drastically reduced.

Figure 9:
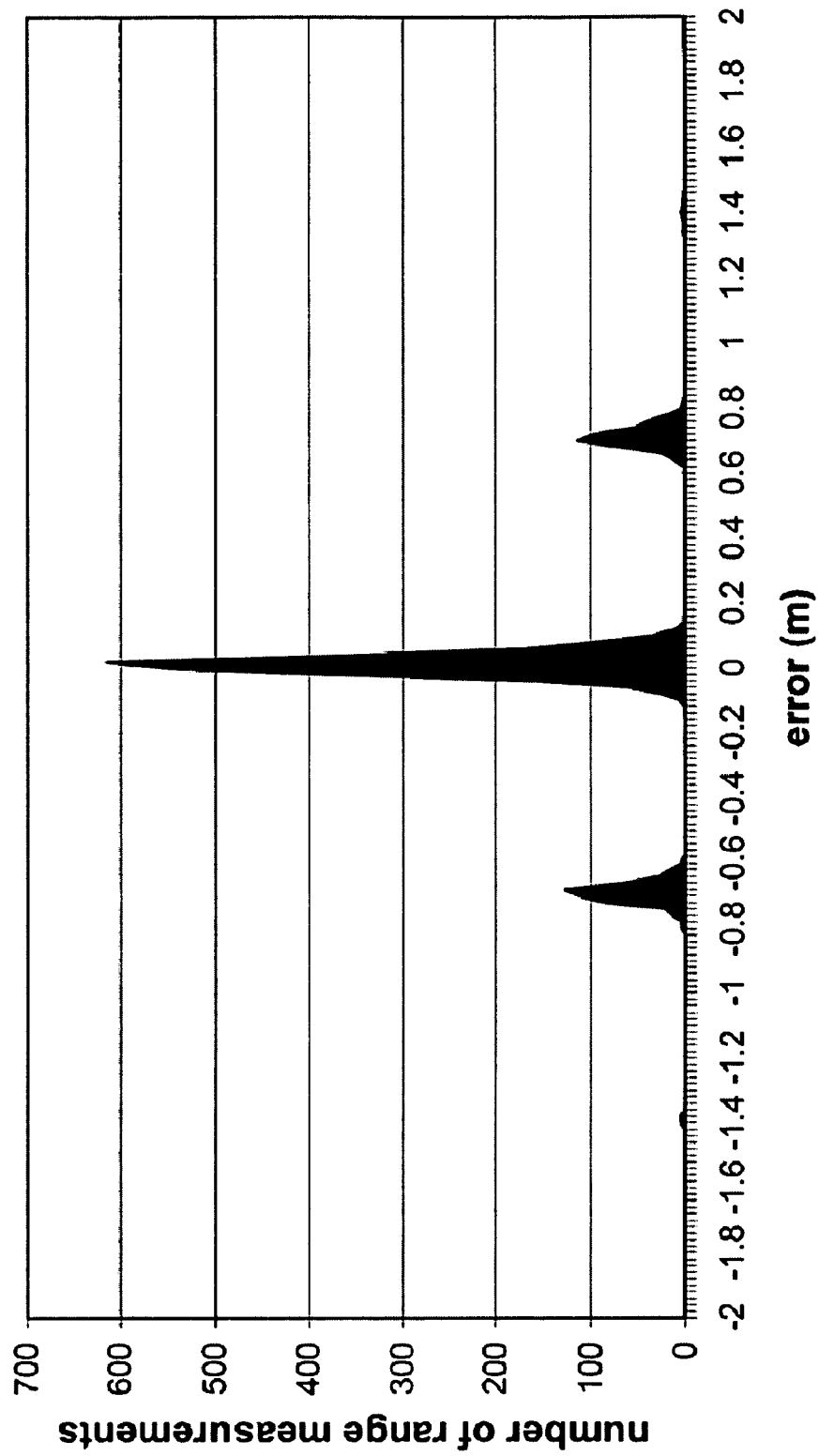
FIG. 9 shows an error distribution of a filtered range according to one embodiment of the present invention.

Ranging Accuracy: The error distribution of the calculated ranges can be approximated by the superposition of a set of Gaussian distributions with centers at integer multiples of the wavelength of the carrier frequency. Depending on the experimental setup, about half of the range estimates have less then one quarter wavelength error with the remaining values shifted by one or two wavelengths as shown in FIG. 9. The ratio of the good and shifted values can be significantly improved using simple filtering techniques while keeping the number of range estimates high enough to enable accurate localization the nodes.

The algorithm measuring the interference signal frequency and phase also determines the average amplitude of the signal. The amplitude shows strong correlation with the error of the range estimate. In one embodiment, a constant amplitude threshold (12% of maximum A/D range) is used to discard measurements with low SNR. This filtering can be carried out locally on each mote acting as receiver, but currently it is done on the base station.

The interference signal is measured by all the nodes in radio range. Due to measurement errors, the frequency estimates will vary at different motes. Nodes that measure the frequency with a large error will likely have a bad phase estimate also. Therefore, these measurements need to be filtered out as well. The filtering is carried out by identifying a narrow frequency window that has the maximum number of frequency estimates in it. All the measurements outside of this window are discarded. This process can also be carried out on the motes, but it would require communication among the active receivers. In one embodiment, it is done on the base station.

Finally, the range is calculated for a given pair of transmitter receiver pairs only if the number of frequency channels with good phase offset measurements is higher than a threshold. This limit is set to 10 in the embodiment of the present invention.

After these three filtering stages, the ratio of the measurements with less then one quarter wavelength error can be improved by approximately 50% as illustrated on FIG. 9.

Figure 10:
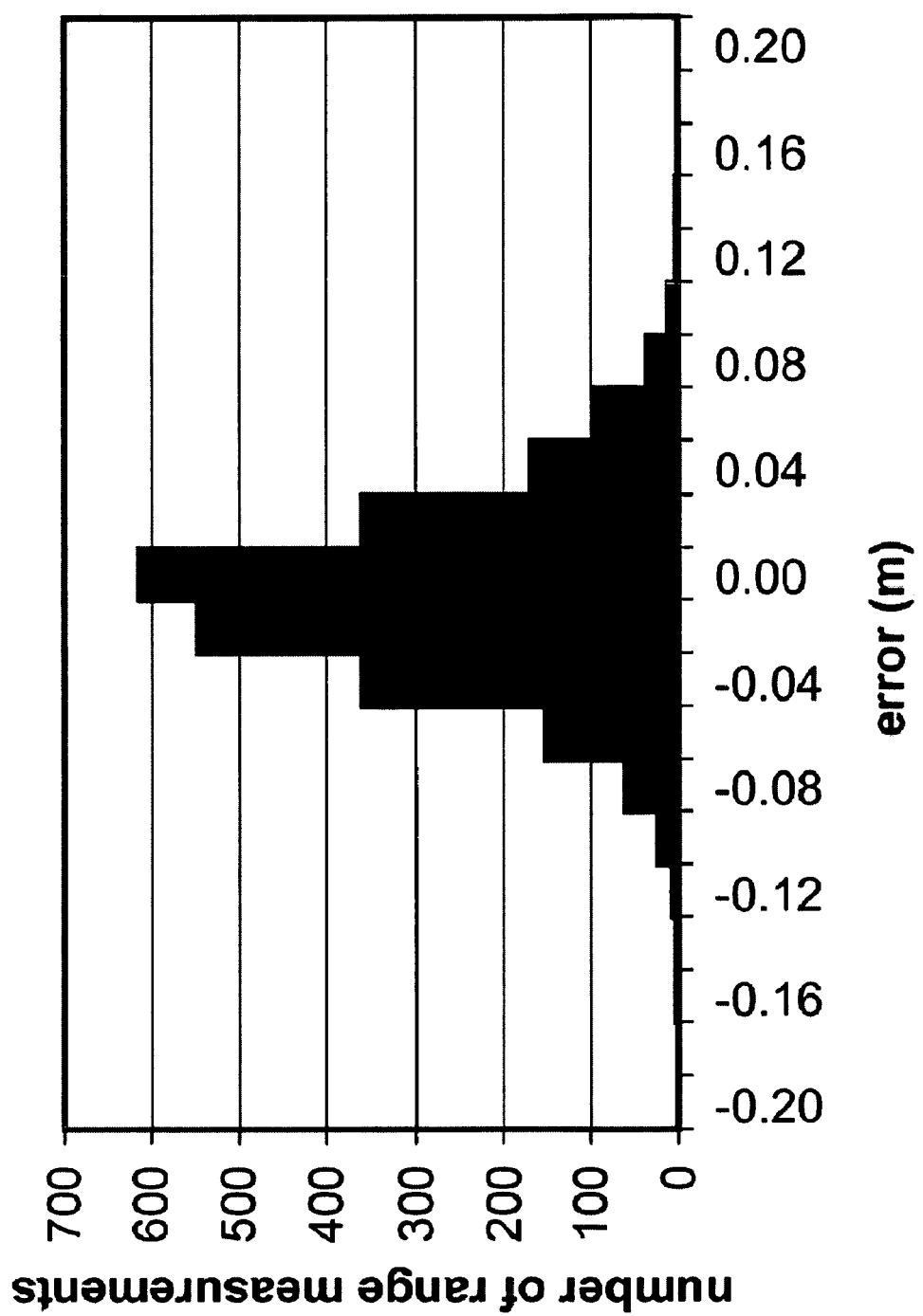
FIG. 10 shows a central portion of the error distribution of the filtered ranges according to one embodiment of the present invention.

FIG. 10 shows the central portion of the error distribution after filtering. The accuracy of these over 2000 measurements clearly demonstrates the potentially extreme high precision of overall localization using RIPS if one can eliminate the "side lobes" of the distribution. More advanced filtering methods is developed to discard measurements with full wavelength errors, increase the accuracy of the phase measurements, or increase the frequency band beyond the [400, 460] MHz range. Even a small improvement in phase estimation accuracy could potentially dramatically increase the ratio of good to bad measurements. Intuitively there is a threshold in the phase measurement error where it is not large enough to cause the range estimator to miss by a full wavelength. An analytical evaluation is needed to quantify this relationship.

Figure 11:
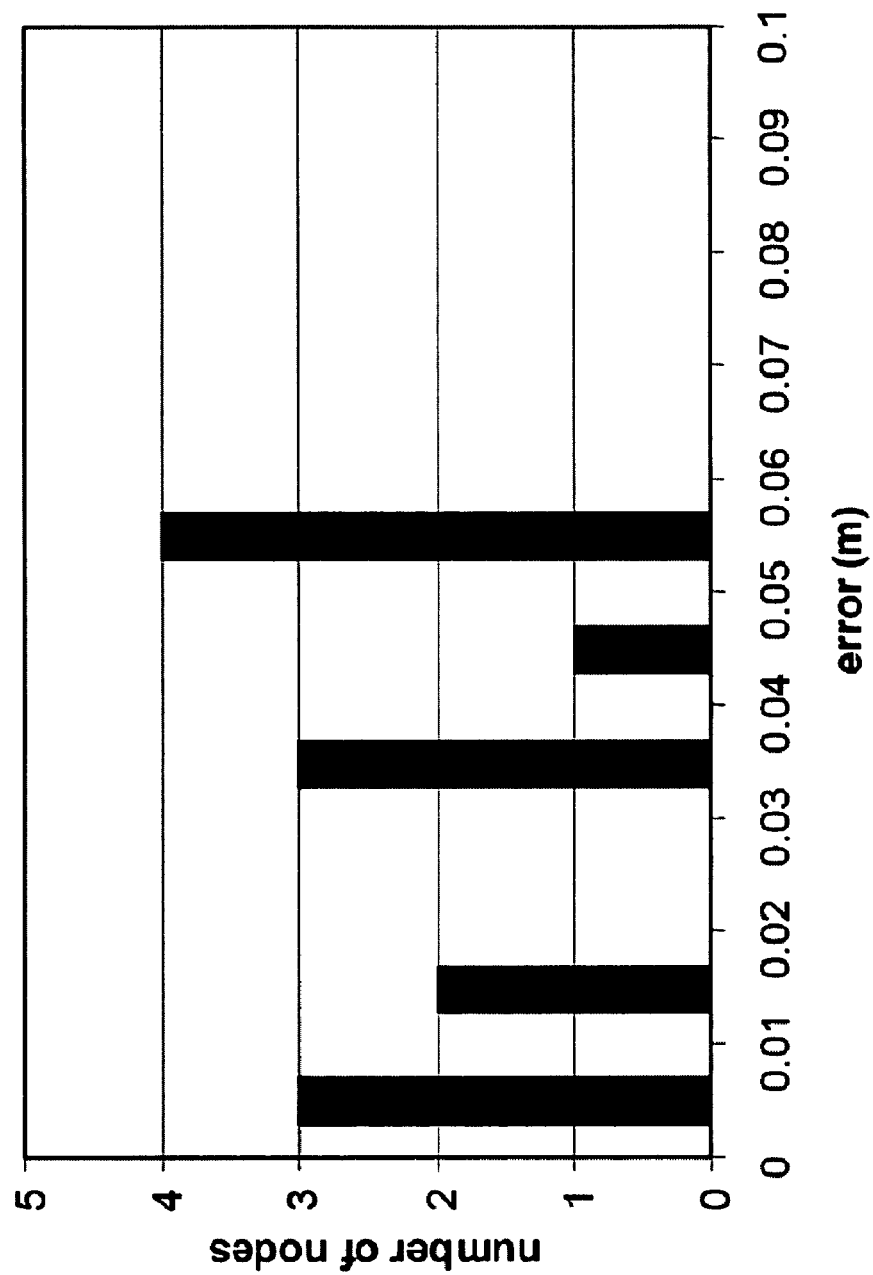
FIG. 11 shows an error distribution of localization according to one embodiment of the present invention.
Figure 12:
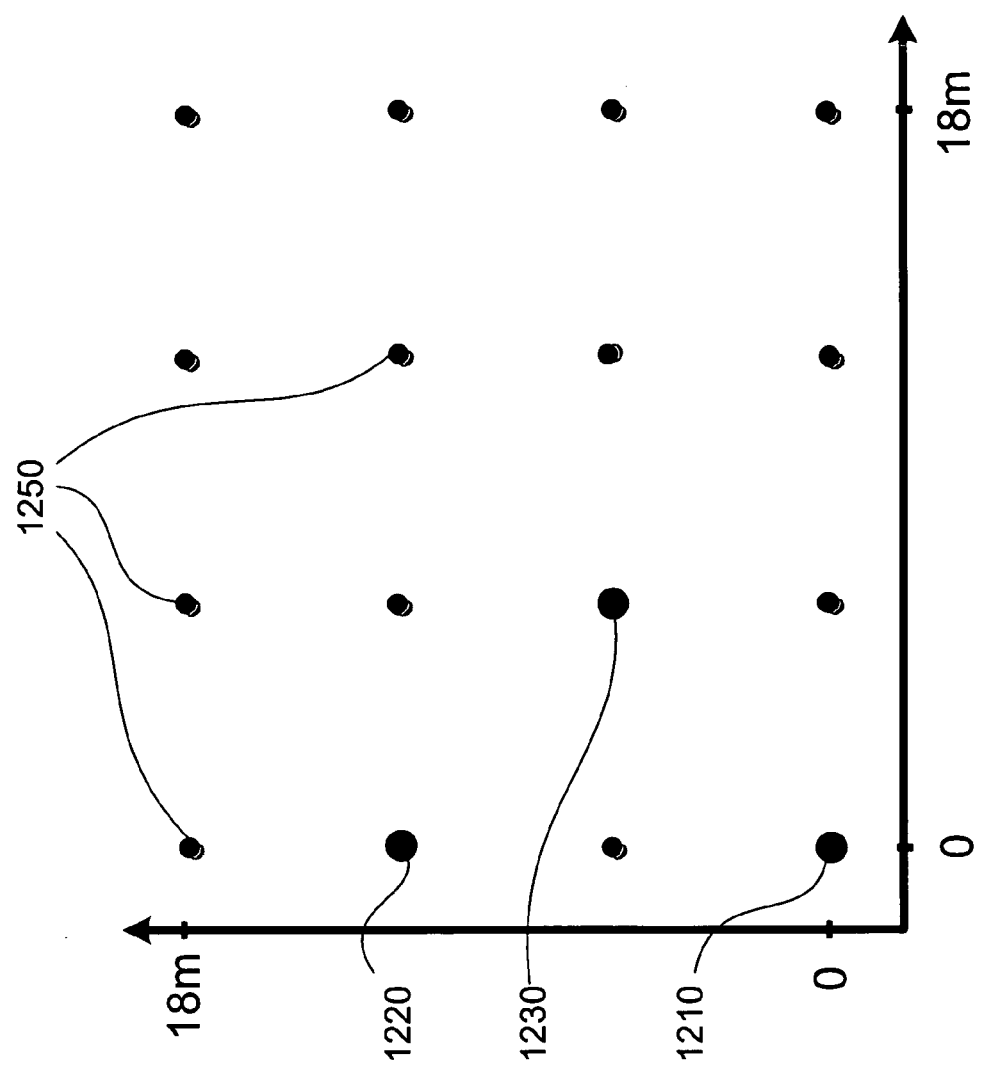
FIG. 12 shows sensor node localization of a wireless sensor network according to one embodiment of the present invention.

Localization Accuracy: localization of sensor nodes was conducted using the setup described above utilizing the filtered ranging data shown in FIG. 9. The genetic optimization procedure ran for 2 minutes. The error distribution of the resulting localization is shown in FIG. 11. The average accuracy was 3 cm, while the largest error was approximately 6 cm. The results are shown in FIG. 12 with the three anchor nodes depicted by large circles 1210, 1220 and 1230. At this resolution and localization accuracy, the small circles 1250 showing the actual and estimated positions overlap.

To test the scalability of the approach, the localization utilizing only 20% of the raw ranging data is re-run. In one embodiment, 48 transmitter pairs are selected out of the possible $$\binom{16}{2} = 240$$

randomly. After filtering, approximately 1000 measurements remained with 28% of them shifted by integer multiples of the wavelengths. This ratio is about the same as for the whole data set. The localization algorithm achieved 5 cm average accuracy, while the worst error remained under 10 cm.

Note that the estimated accuracy of the ground truth and the accuracy of the localization results are comparable. Therefore, these numbers are not exact; they are just indications of the very high precision RIPS can achieve.

Latency: There are $$\binom{16}{2}\binom{14}{2}$$

different configurations of transmitter/receiver pairs in the 16 node experiment described above. Three different amplitude combinations are used for any given four node setup. Therefore, there are altogether approximately 32,000 measurements carried out. Note that not all of these measurements are independent, but it is to gather as much ranging data as possible. There is quite a bit of concurrency, as for any particular transmitter pair, all receivers perform their measurements in parallel. On the other hand, each transmitter pair needs to do multiple measurements for frequency tuning and then multiple frequency channels are used for the actual measurements. The tuning algorithm, range calculations and localization are carried out on the base station, so there is a large amount of data that is shipped to the root of the network.

In the exemplary embodiment, the entire process takes about 80 minutes. This can be sped up significantly. Localization does not need this amount of data; potentially an order of magnitude would work well enough. Additionally, the use of one fifth of the possible transmitter pairs would immediately decrease the time to be less than twenty minutes. Furthermore, the tuning algorithm can be implemented on the motes. It needs to run on one of the receivers of an interference signal. The results then need to be communicated back to the transmitters. This would help scalability in larger setups since the base station need not be involved in tuning at all and hence, message routes would be much shorter. As discussed above, data filtering based on the interference signal amplitude can be done locally on the mote. Additional filtering requires communication between the different receivers of the same interference signal. In a small setup, it would not provide any speedup. For a large deployment, however, this would significantly increase the scalability.

Additional optimization could involve decreasing the number of frequency tuning steps to the minimum necessary.

The number of channels used for the actual phase measurements could also be decreased somewhat if the phase estimation accuracy can be improved. Finally, the mote implementation code is not fully optimized in this first version of RIPS. It is estimated that the entire localization process could be carried out in less than 5 minutes for smaller scale setups. Large setups would require more time, but the process scales well because the network can be automatically divided into sets of non-overlapping regions determined by the radio interferometric range where the procedure can be carried out concurrently. The design of an efficient scheduling algorithm is an area of further research.

SOURCES OF ERRORS

Without limiting the scope of the present invention, the sources of errors of RIPS are list and discussed as follows.

Two nodes transmitting unmodulated radio waves at two close frequencies and two receivers measuring the absolute phase offset of the received r(t) are considered. The absolute phase offset is measured at a fixed time instant that is established between the receivers using some form of time synchronization. The relative phase offset is then calculated by subtracting the absolute phase offsets of the two receivers. The sources of errors are the following:

Carrier Frequency Inaccuracy: the difference between the nominal and the actual carrier frequency of the transmitted signal. According to Theorem 3, the phase measurement error introduced by a 1 kHz carrier frequency inaccuracy for ranges $d_{ABCD}$ less than 1 km is $$\left| 2\pi \frac{d_{ABCD}}{c/f} - 2\pi \frac{d_{ABCD}}{c/(f+1000)} \right| \le \frac{2\pi \cdot 1 \text{ km}}{c \cdot 1 \text{ kHz}} = 0.33\% \cdot 2\pi$$

Carrier Frequency Drift and Phase Noise: the phase noise and drift of the actual carrier frequency of the transmitted signal during the measurement. Theorem 1 relies on the fact that the frequencies of the emitted signals are stable, and any phase noise or carrier frequency drift will be directly observable in the measured phase offset of the envelope signal. This source of error can be minimized by shortening the length of a single phase measurement, and by minimizing the chance of mechanical, electrical and other kinds of shocks the RF chip is subjected to. In one embodiment, one measurement lasts for 29 ms and no phase noise is detected during this interval in an outdoor environment.

Multipath Effects: the RF signal takes different paths when propagating from a transmitter to a receiver, causing amplitude and phase fluctuations in the received signal (fading). In Theorem 2, it is assumed that the radio signal travels from A to C for exactly $d_{AC}/c$ seconds, but this assumption does not hold in the presence of multipath fading. It is expected that in many cases higher level algorithms can filter out inconsistent phase offset measurements corrupted by multipath effects.

Antenna Orientation: change of time of flight introduced by the different orientation or shape of the antennas used by the transmitter and receiver. Regardless of the orientation of antennas, the received radio signal component in Equation (6) originating from A and received by C is always $$a_{AC} \cos[2\pi f_A(t-t_A-d_{AC}/c)].$$

The frequency $f_A$ and transmission time $t_A$ are constants, and by Theorem 1 the amplitude $a_{AC}$ of the signal does not influence the phase offset of the signal strength. It is theoretically possible that the time of flight component $d_{AC}/c$ is influenced by the orientation, but this was not empirically verified.

RSSI Measurement Delay Jitter: the jitter of the delay between the antenna receiving the radio signal and the RF chip delivering the RSSI signal to the signal processing unit. This jitter introduces a relative phase offset error at the two receivers. According to the experiments, the jitter is not noticeable.

RSSI Signal-to-Noise Ratio: the signal strength relative to noise of the rC (t) signal. The SNR mainly depends on the physical distance between transmitters and receiver, as the amplitudes of the transmitted signals are exponentially decreasing in space. The SNR value also depends strongly on the hardware implementation of the RSSI detector circuit at the receiver.

Signal Processing Error: the error introduced by the signal processing algorithm that calculates the phase offset of $r_C(t)$, a noisy, logarithmically distorted, low frequency sinusoid. The frequency and phase estimation of sine waves is a well-studied problem (see e.g. [13, 14]). The theoretical Cramer-Rao bound can be approximated by various signal processing algorithms for a given SNR.

Time Synchronization Error: The time synchronization error of the time instance when the receivers measure their absolute phase offset of the received signal strength. On representative hardware it is possible to establish a time synchronization point with better than 2 μs precision utilizing a single radio message (see [15]). Assuming a 2 kHz interference frequency, this translates to 0.4%·2π phase offset error.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

REFERENCES LIST

[1]. Gy. Simon, M. Maroti A. Ledeczi et al., *Sensor network-based countersniper system*, ACM 2nd Conference on Embedded Networked Sensor Systems (SenSys), November 2004, 1-12.

[2]. T. He, S. Krishnamurthy, J. Stankovic, et al., *An Energy-Efficient Surveillance System Using Wireless Sensor Networks*, MobiSys '04, June, 2004.

[3]. H. Wang, J. Elson, L. Girod, D. Estrin, K. Yao, *Target classification and localization in a habitat monitoring application*, In Proc. of the IEEE ICASSP, April 2003.

[4]. Y. Kwon, K. Mechitov, S. Sundresh, W. Kim and G. Agha, *Resilient localization for sensor networks in outdoor environments*, Technical Report UIUCDCS-R-2004-2449, Department of Computer Science, University of Illinois at Urbana Champaign, 2004.

[5]. K. Whitehouse and D. Culler, *Calibration as parameter estimation in sensor networks*, In Proc of the 1st ACM international workshop on wireless sensor networks and applications, Atlanta, Ga., 2002.

[6]. J. Sallai, Gy. Balogh, M. Maroti, A. Ledeczi and B. Kusy, *Acoustic ranging in resource-constrained sensor networks*, International Conference on Wireless and Mobile Computing (ICWN), June, 2004.

[7]. N. B. Priyantha, A. Chakraborty and H. Balakrishnan, *The Cricket Location-Support System*, In Proc. of MobiCom 2000: The Sixth Annual International Conference on Mobile Computing and Networking, Boston, Mass., August 2000.

[8]. K. Whitehouse, C. Karlof, A. Woo, F. Jiang and D. Culler, *The Effects of Ranging Noise on Multihop Localization: An Empirical Study*, in Proc. of IPSN, Los Angeles, Calif., April, 2005.

[9]. J. Hightower, R. Want and G. Borriello, *SpotON: An Indoor 3D Location Sensing Technology Based on RF Signal Strength*, University of Washington, Tech. Rep. UW CSE 2000-02-02, February, 2000.

[10]. K. Yedavalli, B. Krishnamachari, S. Ravula and Srinivasan, Ecolocation: *A Technique for RF Based Localization in Wireless Sensor Networks*, Proc. of IPSN, Los Angeles, Calif., April, 2005.

[11]. D. Niculescu and B. Nath, *Ad Hoc Positioning System (APS)*, in Proc. of IEEE GLOBECOM 2001, San Antonio, November, 2001.

[12]. L. Meertens, The Dimension of the Vector Space Spanned by Sets of Radio Interferometric Measurements, Technical Report KES.U.05.02, Kestrel Institute, July 2005.

[13]. D. Rife and R. Boorstyn, *Single tone parameter estimation from discrete-time observations*, IEEE Transactions on Information Theory, Volume 20, Issue 5, pp. 591-598, September 1974.

[14]. S. A. Tretter, Estimating the Frequency of a Noisy Sinusoid by Linear Regression, IEEE Transactions on Information Theory, Volume 31, Issue 6, pp. 832-835, November, 1985.

[15]. M. Maroti, B. Kusy, Gy. Simon and A. Ledeczi, *The flooding time synchronization protocol*, ACM 2nd Conference on Embedded Networked Sensor Systems (SenSys), November 2004, 39-49.

[16]. J. Hill, R. Szewczyk, A. Woo, S. Hollar, D. Culler, and K. Pister, *System architecture directions for networked sensors*, ASPLOS 2000, Cambridge, Mass., November, 2000.

[17]. J. Polastre, R. Szewczyk, C. Sharp and D. Culler, *The Mote Revolution: Low Power Wireless Sensor Network Devices*, in Proc. of Hot Chips 16, August, 2004.

[18]. Chipcon Inc., *Chipcon CC1000 Data Sheet, ver. 2.2.*

What is claimed is:

1. A method for radio interference based sensor localization in a wireless sensor network, wherein the wireless sensor network has a plurality of spatially separated sensor nodes with each capable of transmitting and/or receiving a signal, comprising the steps of:
    a. selecting a first sensor node and a second sensor node as a pair of transmitters and each of the remaining sensor nodes as a receiver in the wireless sensor network, respectively;
    b. transmitting a first signal and a second signal from the selected first sensor node and the selected second sensor node, respectively, to the wireless sensor network, wherein the first signal has a frequency, $f_1$, and the second signal has a frequency, $f_2$, the frequencies $f_1$ and $f_2$ being substantially close to each other such that a superposition of the first signal and the second signal in a position of space where a receiver is located results in an interference signal;
    c. using the interference signal received by each of the receivers to estimate a phase offset of the received interference signal at the corresponding receiver, respectively;
    d. obtaining a difference of the phase offsets of the interference signal for a pair of receivers;
    e. calculating a distance range between the pair of transmitters and the corresponding pair of receivers from the obtained difference of phase offsets of the interference signal for the pair of receivers;
    f. repeating steps (d) and (e) for the remaining receivers to obtain a set of the distance ranges; and
    g. localizing relative positions of the plurality of spatially separated sensor nodes in the wireless sensor network from the set of the distance ranges,
wherein the method further comprises the step of performing a frequency tuninci algorithm to determine a radio frequency setting for the pair of transmitters to transmit the first and second signals with a frequency difference substantially close to zero, and wherein performing the frequency tuning algorithm comprises the steps of:
    (i) transmitting a first signal at a frequency varied at a fine-grain step and a second signal at a fixed frequency from a first and second transmitters of the pair of transmitters, respectively;
    (ii) analyzing a frequency of the interference signal received by a receiver to determine the frequency of the first signal for which the frequency of the interference signal substantially close to zero, wherein the frequency of the interference signal is coincident with the frequency difference of the first signal and the second signal; and
    (iii) propagating information of the analyzed frequency back to the first transmitter by the receiver, thereby causing the first transmitter to determine the radio frequency setting of the pair of transmitters for which the frequency of the interference signal is within a predetermined range.

2. The method of claim 1, wherein the distance range is a function of distances between the pair of transmitters and the corresponding pair of receivers.

3. The method of claim 1, wherein the frequency $f_1$ of the first signal and the frequency $f_2$ of the second signal are in the range of radio frequency from about 3 Hz to about 3,000 GHz.

4. The method of claim 1, further comprising the step of calibrating the pair of transmitters to simultaneously transmit the first signal and the second signal, respectively.

5. The method of claim 1, further comprising the step of synchronizing start times of signal transmissions and/or receptions at different sensor nodes of the wireless sensor network before a sensor node transmits and/or receives a signal at a predetermined frequency.

6. The method of claim 1, wherein the localizing step is performed with a genetic algorithm.

7. The method of claim 1, wherein the selecting step is performed with a base station.

8. Software stored on a computer readable medium for causing a computing system to perform radio interference based sensor localization in a wireless sensor network according to claim 1.

9. A method for radio interference based sensor localization in a wireless sensor network, wherein the wireless sensor network has a plurality of spatially separated sensor nodes with each capable of transmitting and/or receiving a signal, comprising the steps of:

a. selecting a pair of sensor nodes from a group of sensor nodes as a pair of transmitters and each of the remaining sensor nodes in the group of sensor nodes as a receiver, respectively, wherein the group of sensor nodes is selected from the wireless sensor network such that the sensor nodes in the group are located within a spatial range;

b. scheduling transmission times for the pair of transmitters to transmit a pair of signals, wherein the pair of signals create an interference signal in a position of space where a receiver is located, and wherein the interference signal has an interference range coincident with the spatial range;

c. calibrating the pair of transmitters to simultaneously transmit the pair of signals at frequencies within a radio frequency setting at the scheduled transmission times, wherein the frequencies of the pair of signals vary according to a fine-grain step at different transmission times;

d. transmitting the pair of signals at the frequencies from the pair of transmitters at the scheduled transmission times;

e. analyzing received signal strength indicator (RSSI) samples of the interference signal at each of the receivers so as to estimate the frequency and phase offset of the interference signal, respectively;

f. obtaining a difference of the phase offsets of the interference signal for a pair of receivers;

g. calculating a distance range between the pair of transmitters and the pair of receivers from the obtained difference of phase offsets of the interference signal for each pair of receivers to obtain a set of the distance ranges; and h. localizing relative positions of the group of sensor nodes in the wireless sensor network from the set of the distance ranges, wherein the calibrating step is performed with a frequency tuning algorithm, and wherein performing the frequency tuning algorithm comprises the steps of:

(i) transmitting a first signal at a frequency varied at a fine-grain step and a second signal at a fixed frequency from a first and second transmitters of the pair of transmitters, respectively;

(ii) analyzing a frequency of the interference signal received by a receiver to determine the frequency of the first signal for which the frequency of the interference signal substantially close to zero, wherein the frequency of the interference signal is coincident with the frequency difference of the first signal and the second signal; and (iii) propagating information of the analyzed frequency back to the first transmitter by the receiver, thereby causing the first transmitter to determine the radio frequency setting of the pair of transmitters for which the frequency of the interference signal is within a predetermined range.

10. The method of claim 9, further comprising the step of repeating steps (a)-(h) for the rest of the plurality of spatially separated sensor nodes in the wireless sensor network.

11. The method of claim 9, wherein the distance range is a function of distances between the pair of transmitters and the corresponding pair of receivers.

12. The method of claim 9, further comprising the step of synchronizing the group of sensor nodes to a common time base so as to align start times of signal transmissions from the pair of transmitters and signal receptions by the receivers of the group of sensor nodes.

13. The method of claim 12, wherein the synchronizing step comprises the steps of:

a. initializing one of the pair of transmitters to broadcast a radio message to the rest of the group of sensor nodes, wherein the radio message contains information of the other transmitter, signal transmission powers, a type of measurement, and a time instant in the local time of the broadcasting transmitter when the measurement is started and is accompanied with a timestamp;

b. converting the arrival timestamp of the radio message at each receiver to the local time of the receiver, respectively;

c. setting up a local timer by the converted local time; and d. re-broadcasting the converted local time.

14. The method of claim 9, wherein each of the pair of signals comprises a sine wave.

15. The method of claim 9, wherein the localizing step is performed with a genetic algorithm.

16. The method of claim 15, wherein the genetic algorithm comprises the steps of:

a. generating a population of population-size random solutions;

b. selecting a subset of population-size solutions randomly from the solutions;

c. evaluating each solution in the subset using an error function, wherein the error function is defined over the node localizations;

d. sorting the solutions of the subset according to errors;

e. removing the worst 20% of the solutions of the subset;

f. generating new solutions by selecting random parents from the best 20% of the rest of the subset and applying genetic operators on the parents; and g. repeating steps (b)-(f) until solutions for the relative localizations of the nodes are found.

17. The method of claim 9, wherein the selecting, scheduling, calculating and localizing steps are performed with a base station.

18. Software stored on a computer readable medium for causing a computing system to perform radio interference based sensor localization in a wireless sensor network according to claim 9.

19. A system for radio interference based sensor localization, comprising:

a. a sensor network having a number, N, of spatially separated sensor nodes, N being an integer, wherein the number N of spatially separated sensor nodes have a first transmitter node and a second transmitter node for transmitting a first signal and a second signal, respectively, to the sensor network, and (N-2) receiver nodes, wherein the first signal has a frequency, $f_1$, and the second signal has a frequency, $f_2$, the frequencies $f_1$ and $f_2$ being substantially close to each other such that a superposition of the first signal and the second signal in a position of space where a receiver node is located results in an interference signal; and b. a base station for communicating with the number N of spatially separated sensor nodes in the sensor network and processing information received from the number N of spatially separated sensor nodes so as to localize the number N of spatially separated sensor nodes, wherein the number N of spatially separated sensor nodes communicate to each other wirelessly, wherein each of the number N of spatially separated sensor nodes comprises a radio chip, and wherein the radio chip is capable of transmitting a radio frequency signal in a predetermined frequency band at different power levels. frequency signal in a predetermined frequency band at different power levels.

20. The system of claim 19, wherein the radio chip is capable of transmitting the radio frequency signal with a short-term stability of the frequency.

21. The system of claim 20, wherein the radio chip is capable of tuning the frequency of the radio frequency signal in fine-grain steps.

22. The system of claim 21, wherein the radio chip is capable of precisely capturing the interference signal.

23. The system of claim 19, wherein each of the first and second signals comprises a radio frequency wave.

24. The system of claim 19, wherein the base station comprises a computer.

25. The system of claim 19, wherein the number N of spatially separated sensor nodes are located in a 2-dimension configuration.

26. The system of claim 19, wherein the number N of spatially separated sensor nodes are located in a 3-dimension configuration.

* * * * *